United States Patent
Lee et al.

(10) Patent No.: US 11,358,484 B2
(45) Date of Patent: Jun. 14, 2022

(54) CHARGER FOR ELECTRIC VEHICLE AND CHARGING CONTROL METHOD OF ELECTRIC VEHICLE

(71) Applicant: Samsung Electronics Co., Ltd., Suwon-si (KR)

(72) Inventors: Hun Lee, Suwon-si (KR); Cheol-hoi Kim, Yongin-si (KR); Ji-hoon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 553 days.

(21) Appl. No.: 16/345,514

(22) PCT Filed: Jun. 9, 2017

(86) PCT No.: PCT/KR2017/005987
§ 371 (c)(1),
(2) Date: Apr. 26, 2019

(87) PCT Pub. No.: WO2018/079970
PCT Pub. Date: May 3, 2018

(65) Prior Publication Data
US 2019/0275907 A1    Sep. 12, 2019

(30) Foreign Application Priority Data

Oct. 28, 2016    (KR) .......................... 10-2016-0141949

(51) Int. Cl.
*B60L 5/00*        (2006.01)
*B60L 53/57*       (2019.01)
(Continued)

(52) U.S. Cl.
CPC ............... *B60L 53/57* (2019.02); *B60L 50/60* (2019.02); *B60L 53/14* (2019.02); *B60L 53/16* (2019.02);
(Continued)

(58) Field of Classification Search
CPC .......... B60L 53/57; B60L 53/14; B60L 53/16; B60L 53/35; B60L 53/665; G05D 1/0212;
(Continued)

(56) References Cited

U.S. PATENT DOCUMENTS 6,263,989 B1 * 7/2001 Won .......................... B25J 5/005
                                                          180/8.7
6,636,781 B1    10/2003 Shen et al.
(Continued)

FOREIGN PATENT DOCUMENTS

CN    103692921 A        4/2014
FR    2991615 A1 * 12/2013 .............. B25J 5/005
(Continued)

*Primary Examiner* — Naum Levin
(74) *Attorney, Agent, or Firm* — Jefferson IP Law, LLP

(57) ABSTRACT

Disclosed are a charger and a method of charging an electric vehicle. A main body of the charger includes a plurality of sub main bodies coupled to each other to transform its shape. The charger with the main body having a first shape moves toward the electric vehicle, and is then transformed to have a second shape. The first shape refers to a shape allowing the main body to be movable on a ground, and the second shape refers to a shape making the main body occupy a smaller surrounding area of the electric vehicle than the first shape. The electric vehicle is charged as connected to the charger having the second shape. The charger does not obstruct traffic of other vehicles because its size is reduced during charging.

13 Claims, 22 Drawing Sheets

(51) Int. Cl.
*B60L 53/35* (2019.01)
*B60L 53/66* (2019.01)
*B60L 53/16* (2019.01)
*G05D 1/02* (2020.01)
*B60L 53/14* (2019.01)
*B60L 50/60* (2019.01)

(52) U.S. Cl.
CPC ............. *B60L 53/35* (2019.02); *B60L 53/665* (2019.02); *G05D 1/0212* (2013.01); *G05D 1/0231* (2013.01); *Y02T 10/70* (2013.01)

(58) Field of Classification Search
CPC ... G05D 1/0231; Y02T 10/7072; Y02T 90/12; Y02T 90/14
See application file for complete search history.

(56) References Cited

U.S. PATENT DOCUMENTS

| | | | |
|---|---|---|---|
| 7,493,976 B2 * | 2/2009 | Goldenberg | B62D 55/075 180/9.1 |
| 8,013,567 B2 | 9/2011 | Windsor | |
| 8,299,754 B2 * | 10/2012 | Hayashigawa | B60L 50/30 320/109 |
| 9,114,714 B2 | 8/2015 | Pham et al. | |
| 9,592,742 B1 * | 3/2017 | Sosinov | H02J 50/10 |
| 9,623,783 B1 * | 4/2017 | Muller | B60P 3/06 |
| 9,770,993 B2 * | 9/2017 | Zhao | B60L 53/68 |
| 10,065,690 B2 * | 9/2018 | Summer | B62D 55/305 |
| 10,093,189 B2 * | 10/2018 | Sommarstrom | B25J 9/009 |
| 10,340,709 B2 * | 7/2019 | Dyer | B60L 53/53 |
| 10,427,530 B2 * | 10/2019 | Ricci | B60L 53/14 |
| 2013/0338820 A1 | 12/2013 | Corbett et al. | |
| 2014/0021075 A1 * | 1/2014 | Deschamps | E01D 15/20 206/216 |
| 2014/0097786 A1 | 4/2014 | Grimes et al. | |
| 2015/0028811 A1 | 1/2015 | Krammer et al. | |
| 2017/0129357 A1 * | 5/2017 | Zheng | B60L 53/35 |
| 2017/0136891 A1 * | 5/2017 | Ricci | B60L 53/60 |
| 2018/0001777 A1 * | 1/2018 | Kilic | B60L 53/14 |
| 2018/0290561 A1 * | 10/2018 | Baumgartner | B60L 53/126 |

FOREIGN PATENT DOCUMENTS

| | | |
|---|---|---|
| JP | 2013 025753 A | 2/2013 |
| JP | 2013-059249 A | 3/2013 |
| JP | 2016-103933 A | 6/2016 |
| KR | 10-2011-0080308 A | 7/2011 |
| KR | 10-2014-0072675 A | 6/2014 |
| KR | 10-1410272 B1 | 6/2014 |
| KR | 10-2016-0108962 A | 9/2016 |

* cited by examiner

CHARGER FOR ELECTRIC VEHICLE AND CHARGING CONTROL METHOD OF ELECTRIC VEHICLE

TECHNICAL FIELD

The disclosure relates to a charger for an electric vehicle and a charging control method of the electric vehicle, and more particularly to a movable charger for an electric vehicle and a charging control method of the electric vehicle

BACKGROUND ART

Due to a problem of environmental pollution caused by fine dust, exhaust from a vehicle, etc. and burdensome prices of gasoline or diesel, i.e. vehicle fuel, there is a growing demand for eco-friendly/low-pollutant vehicles.

An electric vehicle gets power from electric energy and thus has advantages of making a very small noise without having exhaust. Accordingly, the development and spread of the electric vehicle have been on the rise.

The electric vehicle is internally provided with a rechargeable battery to supply the electric energy. For the popularization of the electric vehicle, there is a need of constructing charging facilities for charging such a battery.

DISCLOSURE

Technical Problem

Typically, the battery of the electric vehicle is charged for more than 30 minutes. Therefore, the existing charging facilities such as charging stations are inadequate to meet the growing demand for the electric vehicle, and it is inconvenient for a user because the battery is not charged in time for charging due to the limited capacity of the battery.

Further, a zone where the charging facilities are installed is for the exclusive use of the electric vehicle, thereby reducing a room for general vehicles. For this reason, the installation of the charging facilities is subject to restriction based on various civil complaints, in particular, in apartment houses.

Accordingly, there is a need of providing charging facilities and/or a charging service which is adequate for a residential environment of a user of the electric vehicle, does not obstruct a parking space or driving way for other vehicles, and is more convenient for a user.

Technical Solution

According to an embodiment of the disclosure, a charger for an electric vehicle includes a main body including a charging connector to be connected to a charging terminal provided in the electric vehicle; a moving unit provided in the main body and configured to make the main body be movable; a transformer configured to switch an outer appearance of the main body over between a first shape allowing the main body to be movable on a ground through the moving unit and a second shape making the main body occupy a smaller surrounding area of the electric vehicle than the first shape during a charging operation for the electric vehicle; and a controller configured to control the transformer to switch the outer appearance of the charger over from the first shape to the second shape, based on the main body being positioned to be connectable with the charging terminal through the connector. Thus, it is possible to do charging for a long time without obstructing traffic of other vehicles because the surrounding area of the electric vehicle occupied by the charger having the second shape is minimized during charging.

The main body may include a plurality of sub main bodies coupled to be switchable between the first shape and the second shape based on change in a relative position thereof. Thus, the charger is easily switchable between the first shape for traveling and the second shape for charging, as necessary.

The sub main body may include a first sub main body and a second sub main body, each of which is shaped like a plate, and one end portion of the second sub main body may be coupled to slide along a lengthwise direction on a plate surface of the first sub main body. The first shape may include a shape in which the first sub main body and the second sub main body are coupled to each other to form a T-shape, and the second shape may include a shape in which the first sub main body and the second sub main body are coupled to each other to form an L-shape.

The plurality of sub main bodies may be coupled to each other rotatable on each first end portion thereof used as a rotation axial line, the first shape may include a shape in which the sub main bodies are relatively rotated on the rotation axial line to come close to each other with second end portions thereof being supported on the ground, and the second shape may include a shape in which the sub main bodies are relatively rotated on the rotation axial line to be disposed on one plane.

The controller may control the moving unit to move the main body to a position for charging the electric vehicle, based on a charging request for the electric vehicle. Thus, the charger autonomously travels to the position of the electric vehicle that is in need of charging, and performs charging in the existing parking space, thereby making better use of a space.

The charger may further include a camera or sensor configured to detect surroundings of the main body; and a storage configured to store a trip algorithm for the charger or a map of an installation space for the charger, wherein the controller controls movement of the charger by applying detection data obtained from the camera or the sensor to the algorithm or the map. Thus, the charger can autonomously travel to a desired position by properly avoiding an obstacle even though the obstacle is positioned on a traveling path.

The electric vehicle may be provided with a power receiving module including a connecting portion to connect with the connector and a charging cable to connect with the charging terminal, and the connector may be connected to the connecting portion and makes charging power be supplied to the electric vehicle through the power receiving module. Thus, the electric vehicle can be charged using the power receiving module, regardless of the shape, installation position, etc. of the charging terminal of the electric vehicle.

The charger may further include a communicator configured to obtain a charging request for the electric vehicle from at least one of a user terminal apparatus, a server, the power receiving module and the electric vehicle. Thus, the charging request may be generated by various devices, and it is convenient for a user because the charger instantaneously moves for charging in response to the charging request.

Meanwhile, according to an embodiment of the disclosure, a method of controlling a charger for an electric vehicle includes: moving the charger to a position to be connectable with a charging terminal provided in the electric vehicle, based on an outer appearance of a main body of the charger having a first shape allowing the main body to be movable on a ground by a moving unit provided in the charger; transforming the outer appearance of the main body to have a second shape making the main body occupy a smaller surrounding area of the electric vehicle than the first shape based on the charger reaching the connectable position; and charging the electric vehicle through a charging connector of the charger connected to the charging terminal of the electric vehicle based on the second shape. Thus, the charger autonomously travels to the position of the electric vehicle that is in need of charging, and there are no needs of preparing a separate space for charging facilities, thereby making better use of a space.

The method may further include moving the charger as transformed into the second shape to make the main body at least partially enter under the electric vehicle. Thus, it is possible to do charging for a long time without obstructing traffic of other vehicles because the surrounding area of the electric vehicle occupied by the charger having the second shape is minimized during charging. In other words, the transformation into the first shape is required because height difference between the ground and the bottom of the charger is too low to smoothly travel in a case of the second shape.

The method may further include: transforming the main body to have the first shape based on completion of the charging; and moving the charger having the first shape to a charging station or a position of another charging target, i.e. another electric vehicle. Thus, a single charger may be employed in charging a plurality of electric vehicles being in need of charging.

The method may further include making payment of charging expenses as the charging is completed. The method may further include, by the charger, obtaining information about a battery remaining or charging state of the electric vehicle targeted for the charging, wherein the payment may be made based on the obtained information. Thus, a charging service provider is improved in reliability based on correct calculation and payment of charging expenses.

The method may further include: by the charger, making the battery of the charger be supplied with charging power, with which the electric vehicle will be charged, from the charging station, wherein the supply of the charging power is performed in a time slot during which power consumption is low. Thus, load is reduced in a time slot in which power consumption is concentrated, and idle power is utilized to thereby have an effect on improving energy efficiency.

The method may further include, by the charger, obtaining a charging request from at least one of a user terminal apparatus, a server, a power receiving module, and the electric vehicle. Thus, the charging request may be generated by various devices, and it is convenient for a user because the charger instantaneously moves for charging in response to the charging request.

The main body may include a plurality of sub main bodies coupled to be switchable between the first shape and the second shape based on change in a relative position thereof. Thus, the charger is easily switchable between the first shape for traveling and the second shape for charging, as necessary.

The method may further include obtaining detection data about surroundings of the charger from a camera or a sensor, wherein the movement of the charger to the position for the connection may be controlled by applying the obtained detection data to a trip algorithm for the charger or a map of an installation space for the charger. Thus, the charger can autonomously travel to a desired position by properly avoiding an obstacle even though the obstacle is positioned on a traveling path.

Advantageous Effects

According to an embodiment of the disclosure, it is convenient for a user of an electric car which is frequently in need of charging, because charging facilities including a charger is easily installable in a parking space of a user's residence or workplace. That is, it is possible to provide a charging infrastructure for an electric car without conflict of interest with owners of general vehicles. The existing stationary charger for the electric car needs to designate a certain space in a parking lot as an exclusive parking zone for an electric car. However, according to an embodiment of the disclosure, a charging station is installable in a space, which is free from traffic and parking of the vehicles, in the parking lot. Therefore, the existing parking space of the parking lot is not occupied, and there are no needs of managing the parking space dedicated for charging the electric car, thereby providing the infrastructure for charging the electric car without inconvenience of owners of general vehicles.

Further, according to an embodiment of the disclosure, a user does not have to frequently visit a charging station in order to charge the electric car. In other words, at least dozens of minutes are taken to charge the electric car, and therefore the current driving pattern of stopping at a gas station and filling up with fuel during travel is difficult to be applied to a vehicle using fossil fuel. According to an embodiment of the disclosure, the battery is charged while the electric car is parking, thereby solving above inconvenience in charging the electric car.

Further, a charging method according to an embodiment of the disclosure is applicable to any electric car regardless of electric-car manufacturers and charging types/standards because a power receiving module serves as a kind of multi-adapter.

Further, conventionally, the existing charging facilities is not available for an electric car while being occupied by another electric car. However, according to an embodiment of the disclosure, one or more chargers can autonomously travel so that charging can be performed at the position of the electric car being in need of charging, thereby expecting a high managing efficiency.

Further, the existing stationary quick-charging facilities requires much construction expenses for separate high-voltage distribution lines, but the separate high-voltage distribution lines are not essential for a charging station according to an embodiment of the disclosure to thereby have relatively low initial installation expenses.

Further, according to an embodiment of the disclosure, a charging time for the charger is controlled to use electric power in a time slot (or a midnight slot) during which power consumption is low, but restrained from using electric power in hot weather/cold weather and the like time/time slot during which power consumption rapidly increases, thereby expecting a smart grid effect on improving a national energy application efficiency.

\* Reference Numerals \*

| | |
|---|---|
| 100: charger | 101: first sub main body |
| 102: second sub main body | 110: connector |
| 120: communicator | 130: sensing unit |
| 140: battery | 150: transformer |
| 160: moving unit | 170: storage |
| 180: controller | 200: electric vehicle |
| 210: power receiving module | 230: sensing unit |
| 240: battery | 245: charging terminal |
| 300: terminal apparatus | 400: server |
| 600: charging station | 610: power supplying connector |

BEST MODE

Below, exemplary embodiments will be described with reference to accompanying drawings to such an extent as to be easily realized by a person having an ordinary knowledge in the art. The present inventive concept is not limited to the embodiments set forth herein, and may be materialized variously.

Terms to be used in the following descriptions will be selected as general terms currently used as widely as possible taking functions of elements into account, but may be varied depending on intent of those skilled in the art, precedents, the advent of new technology, etc. In particular, there may be a term voluntarily selected by the applicant. In this case, the meaning of the term will be explained in detail through the relevant detailed descriptions. Therefore, the terms set forth herein have to be read in light of its meaning and content throughout the following descriptions rather than naming.

In the following descriptions, terms such as "include" or "have" refer to presence of features, numbers, steps, operations, elements or combination thereof, and do not exclude presence or addition of one or more other features, numbers, steps, operations, elements or combination thereof.

A "portion" set forth herein refers to software or hardware such as a field-programmable gate array (FPGA) or an application-specific integrated circuit (ASIC), and performs certain roles. However, the meaning of the "portion" is not limited to software or hardware. The "portion" may be configured to be present in a storage medium for addressing or may be configured to reproduce one or more processors. For example, the "portion" includes software elements, object-oriented software elements, class elements, task elements and the like elements, and processes, functions, attributes, procedures, subroutines, segments of a program code, drivers, firmware, a microcode, a circuit, data, a database, data structures, tables, arrays and variables. The function provided in the elements and the "portions" may be carried out by combining fewer elements and "portions" or may be subdivided by additional elements and "portions".

For clarity of the disclosure in association with the drawings, portions not directly related to the elements of the disclosure may be omitted, and like numerals refer to like elements throughout.

Figure 1:
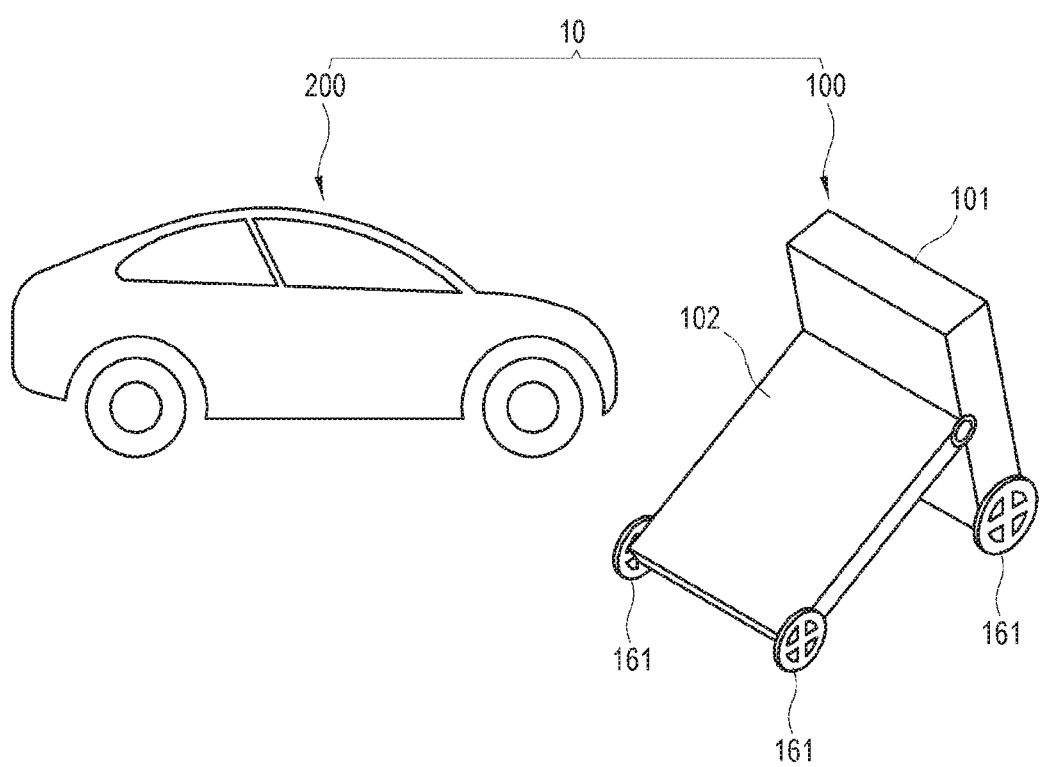
FIG. 1 illustrates an example of an electric vehicle charging system according to an embodiment of the disclosure.

FIG. 1 illustrates an example of an electric vehicle charging system 10 according to an embodiment of the disclosure.

As shown in FIG. 1, the charging system 10 includes a charger 100 movable by a moving unit (see '160' in FIG. 20) including a traveling wheel 161, and an electric vehicle (hereinafter, also referred to as an 'electric car') 200 to be subjected to charging.

The charger 100 of the disclosure refers to an autonomous driving or unmanned apparatus. According to an embodiment, the charger 100 may be actualized by an autonomous mobile robot that includes a camera, a sensor, etc. to autonomously recognize its own position and moves to a destination via an optimal route.

According to an embodiment, the charger 100 is provided in a parking space such as a parking lot that belongs to a residence or workplace of a user, i.e. a driver or operator of the electric car 200, and makes the user use charging facilities without visiting a charging station.

The charger 100 is internally provided with a battery 140 for supplying charging power. The battery 140 of the charger 100 has high capacity, for example, enough to supply power of 30 kwh at a time.

The charger 100 charges the battery 140 with the charging power received from the charging station 600 of the parking space, and moves, i.e. autonomously moves to the position of the charging target, i.e. the electric car 200, thereby supplying the charging power to the charging target, i.e. the electric car 200.

According to an embodiment, the charger 100 includes a main body, of which the outer appearance is alternately changed (or transformed) between a first shape and a second shape.

In the disclosure, the first shape is defined as a shape for making the main body of the charger 100 move on the ground of the parking space or the like through the moving means, i.e. the moving unit 160, and the second shape is defined as a shape for making the charger 100 charge the electric vehicle 200 in a stationary mode. Here, the second shape has a smaller area around the electric car 200, which is occupied by the main body during a charging operation, than the first shape. The first shape is achieved to have a structure stable enough to easily go over a speed bump or the like obstacle while the charger 100 is moving.

Figure 20:
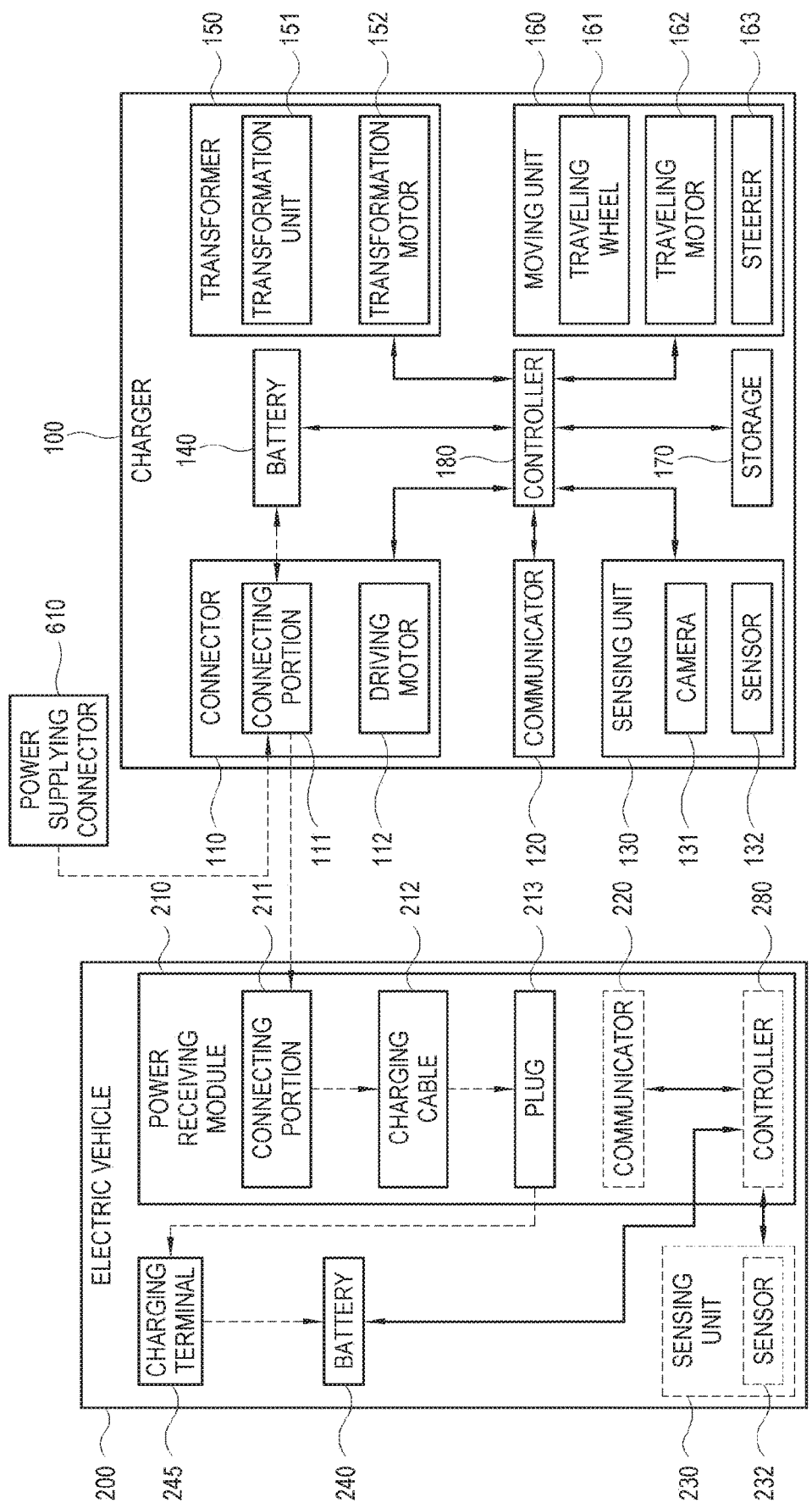
FIG. 20 is a block diagram showing configurations of a charger and an electric vehicle according to an embodiment of the disclosure.

Meanwhile, the electric vehicle charging system 10 according to an embodiment of the disclosure may further include at least one user terminal apparatus (see '300' in FIG. 20) and/or a server (see '400' in FIG. 20). Further, the electric vehicle charging system 10 may further include a charging station (see '600' in FIG. 20) installed in a certain area such as a parking lot, etc.

In the user terminal apparatus 300, an application for controlling the charger 100 and making charging payment may be downloaded and installed. This application may be generated by a manager of the charging facilities, i.e. the charging system 10 and distributed through a market.

A user executes the application on a terminal apparatus 300, remotely controls the electric car 200 to be charged by calling the charger 100, and makes charging mode information received through wireless communication with the charger 100 and/or the electric car 200 be displayed. Further, the application may have an alarming function for change in a mode such as a charging start, a charging type, a charging stop, etc. and transmit a charging stop command from a user to the charger 100. The terminal apparatus 300 may perform wireless communication with at least one of the charger 100, the electric car 200, a power receiving module 210, and a server 400.

Below, various embodiments where the main body of the charger 100 is changed in the outer appearance will be described with reference to the accompanying drawings.

Figure 2:
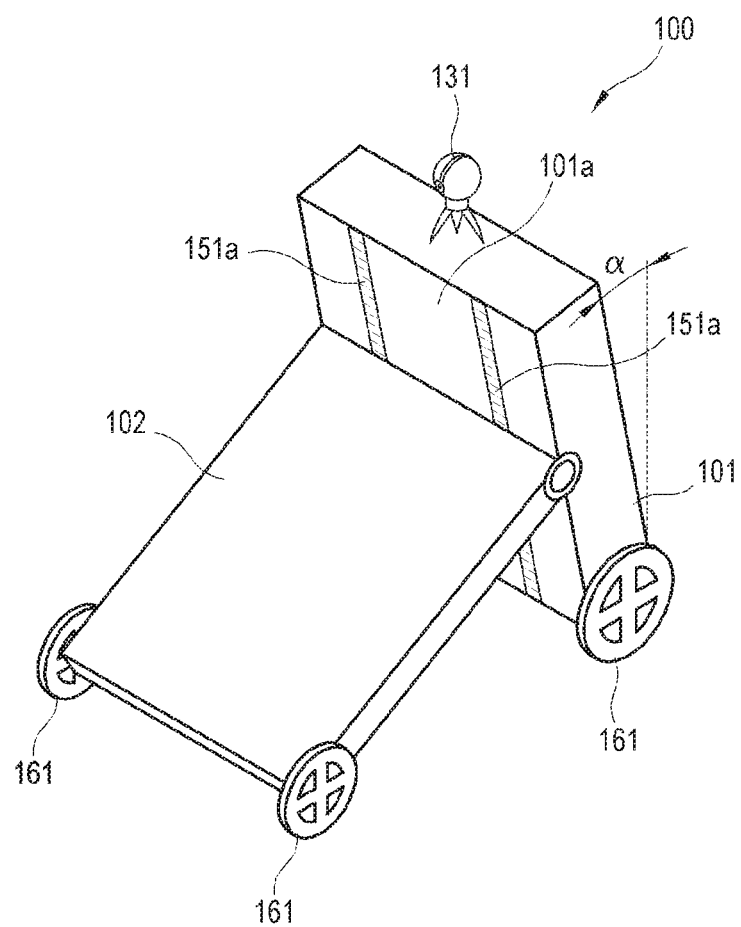
FIGS. 2 to 4 illustrate a first shape of a charger according to a first embodiment of the disclosure.
Figure 3:
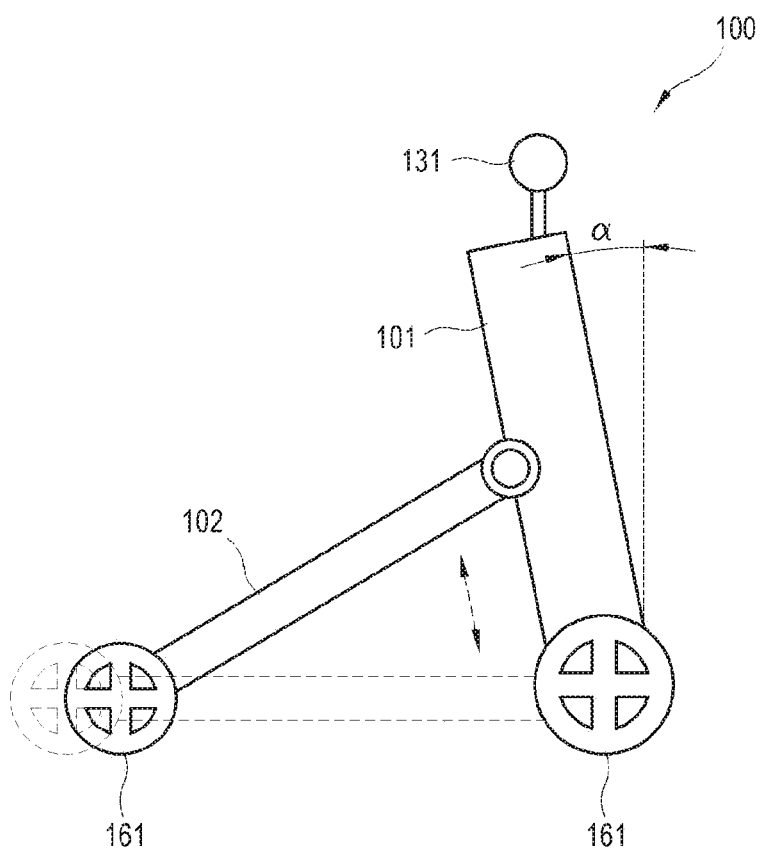
Figure 4:
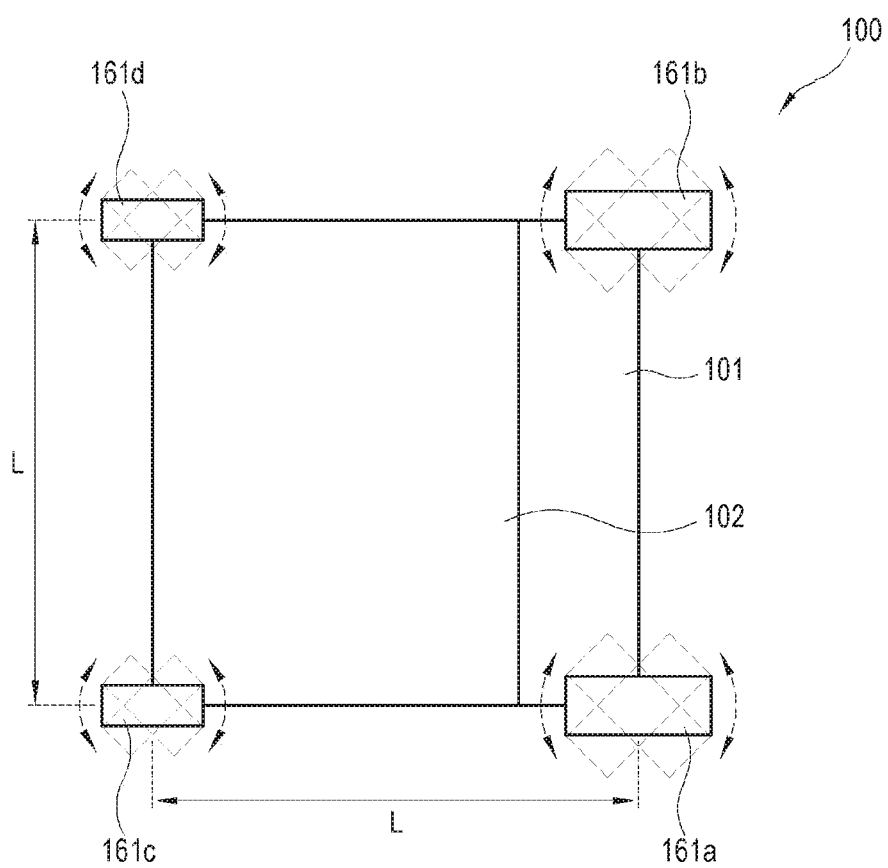

FIGS. 2 to 4 illustrate the first shape of the charger according to a first embodiment of the disclosure, in which FIG. 2 is a perspective view of the charger 100 having the first shape, FIG. 3 is a front view of the charger 100 in FIG. 2, and FIG. 4 is a bottom view of the charger 100 in FIG. 2.

Figure 5:
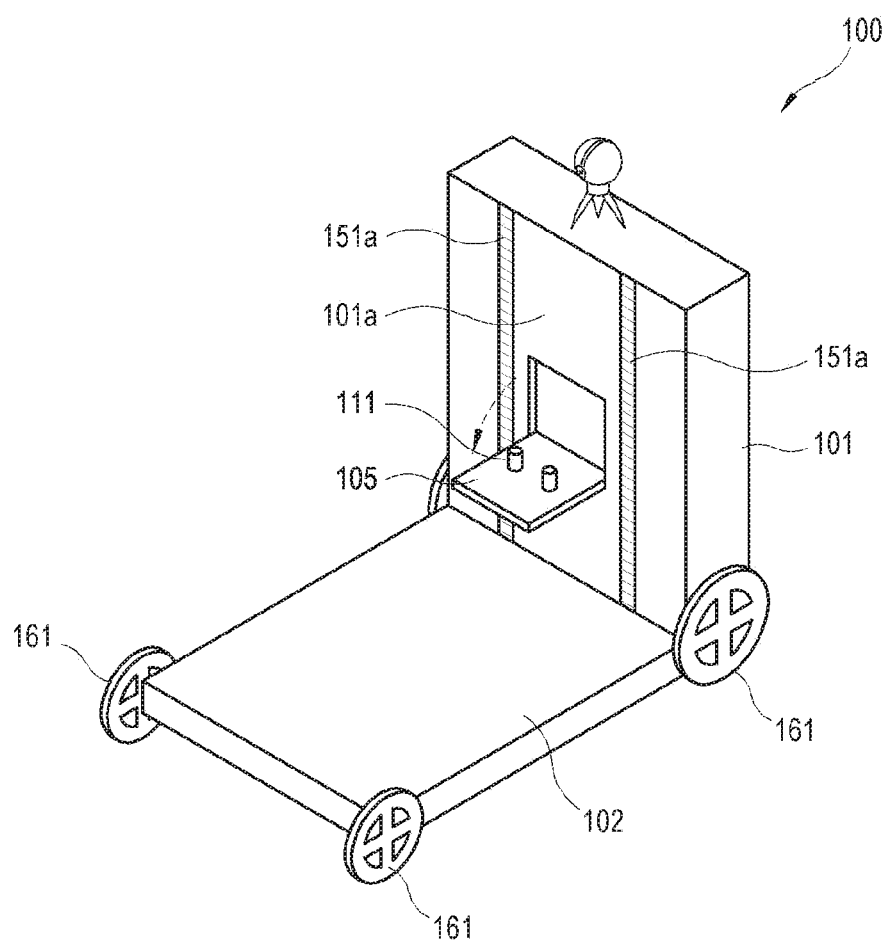
FIGS. 5 and 6 illustrate a second shape of the charger according to the first embodiment of the disclosure.
Figure 6:
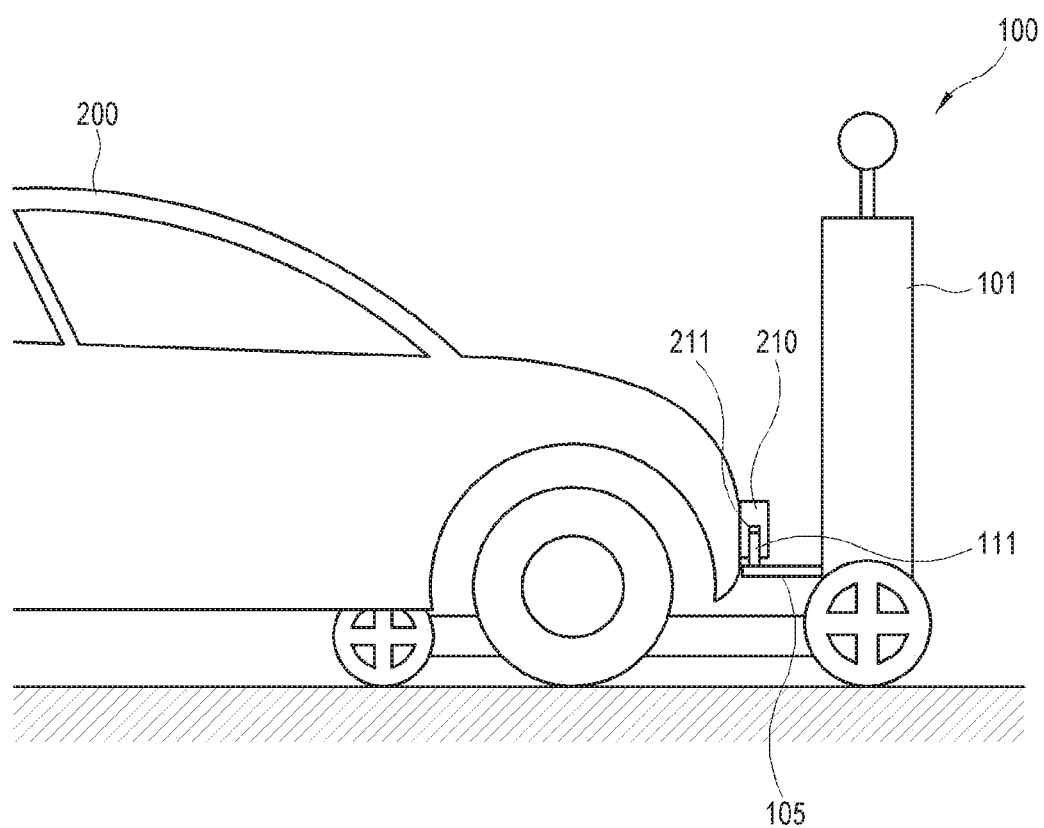

FIGS. 5 and 6 illustrate the second shape of the charger according to the first embodiment of the disclosure, in which FIG. 5 is a perspective view of the charger 100 having the second shape, and FIG. 6 is a front view of the charger 100 in FIG. 5.

The main body of the charger 100 according to an embodiment of the disclosure includes a plurality of sub main bodies 101 and 102 of which relative positions are changed to alternate between the first shape and the second shape. For example, the charger 100 having the first shape may be switched over from the first shape to the second shape as the plurality of sub main bodies are gradually spaced apart from each other or from the second shape to the first shape as the plurality of sub main bodies gradually come close to each other, which will be described later.

In the first embodiment, the plurality of sub main bodies includes a first sub main body 101, and a second sub main body 102 coupled to the first sub main body 101 as shown in FIGS. 2 to 6. The first sub main body 101 and/or the second sub main body 102 may have a plate shape, i.e. be shaped like a flat plate. The second sub main body 102 has a thickness lower than the minimum ground clearance of a typical vehicle, for example, a thickness of about 100 mm, so as to enter under the electric car 200 while having the second shape.

In the charger 100 according to the first embodiment of the disclosure, one end portion of the second sub main body 102 is coupled to move up and down, i.e. slide along the lengthwise direction on a plate surface 101a of the first sub main body 101. The first sub main body 101 may selectively stand up as one end portion of the second sub main body 102 slides along the plate surface 101a of the first sub main body 101.

According to an embodiment, the plate surface 101a of the first sub main body 101 may be provided with at least one guide rail 151a as shown in FIGS. 2 and 5 to guide the second sub main body 102 to slide. The guide rail 151a may be actualized in the form of a rack rail.

Further, one end portion of the second sub main body 102 (i.e. an end portion to be coupled to the first sub main body 101) may be provided with at least one transformation wheel (not shown) that moves along the guide rail 151a. The transformation wheel may be actualized by a sawtooth which can move along the guide rail 151a and stop at a predetermined position.

As the transformation wheel moves along the corresponding guide rail 151a, the second sub main body 102, specifically, one end portion of the second sub main body 102 moves up and down, i.e. slides along the first sub main body 101.

According to the first embodiment, the main body of the charger 100 can be switched over between the first shape and the second shape by such a sliding operation. The guide rail 151a and the transformation wheel are provided as a transformation unit (see '151' in FIG. 20) in the main body, and the transformation unit 151 is included together with a transformation motor (see '152' in FIG. 20) in a configuration of the transformer (see '150' in FIG. 20).

As shown in FIGS. 2 and 3, the first shape according to the first embodiment corresponds to a shape where the second sub main body 102 supports the first main body as one sliding end portion of the second sub main body 102 is coupled to a predetermined position on the plate surface 101a of the first sub main body 101 in the state that the first sub main body 101 stands up as inclined at a predetermined angle α. According to the first embodiment, the first shape of the charger 100 has an outer appearance that the first sub main body and the second sub main body are coupled to have a cross section like an alphabetical character of "T" or a Korean alphabet of "ㅅ", and thus the first shape may be also called a "T"- or "ㅅ"-shape.

The main body of the charger 100 includes a wheel, i.e. the traveling wheel 161 for moving on the ground.

According to an embodiment, the charger 100 may be provided in such a manner that one pair of traveling wheels 161 is attached to each of the first sub main body 101 and the second sub main body 102 as shown in FIGS. 2 to 5. The traveling wheel 161 together with a traveling motor 162 and a steerer 163 is included in the moving unit 160 (to be described later). The steerer 163 may be applied to front wheels, rear wheels, or four wheels of the traveling wheels 161.

The charger 100 is changed in shape and size of a ground space occupied by the plurality of traveling wheels 161 as the second sub main body 102 slides.

In the charger 100 having the first shape according to the first embodiment of the disclosure, one end portion of the second sub main body 102 is coupled to the plate surface 101a of the first sub main body 101 at a position where a space occupied by four traveling wheels 161a, 161b, 161c and 161d has a square shape of which width and length are the same (e.g. a width of L and a length of L) as shown in FIG. 4.

The foregoing square is formed by virtually connecting the four traveling wheels 161a, 161b, 161c and 161d, and it is easy to control the direction of the moving charger 100, i.e. steer the moving charger 100 by controlling revolutions per minute (RPM) of each of the plurality of traveling wheels 161a, 161b, 161c and 161d. According to this embodiment, a steering effect is created by controlling each RPM of the traveling wheels 161a, 161b, 161c and 161d without the steerer 163 for physically changing the angle of the traveling wheel 161.

Meanwhile, the second shape according to the first embodiment may correspond to a shape in which the second sub main body 102 shaped like a flat plate is disposed in parallel with the ground, and the first sub main body 101 shaped like a flat plate and standing is vertically coupled to the second sub main body 102, as shown in FIGS. 5 and 6. According to the first embodiment, the second shape of the charger 100 has an outer appearance that the first sub main body 101 and the second sub main body 102 are coupled to have a cross section like an alphabetical character of "L" or a Korean alphabet of " ㄴ ", and thus the second shape may be also called an "L"- or " ㄴ "-shape.

In the charger 100 having the second shape, as shown in FIG. 6, the second sub main body 102 is horizontally disposed on the ground so as to enter under the electric car 200. Therefore, a connector 110 provided in the first sub main body 101 is connected, i.e. docked to the power receiving module 210 of the electric car 200, thereby achieving charging for the electric car 200.

According to the first embodiment of the disclosure, the connector 110 is provided in the first sub main body 101. As shown in FIG. 5, the connector 110 may include a connector cover 105 provided in the plate surface 101a of the first sub main body 101. Here, the connector cover 105 is openable, and the open connector cover 105 may be provided with, for example, a first connecting portion 111 such as a plug. The power receiving module 210 of the electric car 200 is provided with a second connecting portion 211 such as a jack or port into which the first connecting portion 111 shaped like a plug can be inserted. According to an embodiment, the second connecting portion 211 may be provided at a bottom side of the power receiving module 210.

The connector cover 105 is automatically opened/closed and height-controlled by a driving motor 112 (to be described later) so that the first connecting portion 111 and the second connecting portion 211 can couple with each other to thereby supply power to the electric car 200.

In other words, as shown in FIG. 6, the first connecting portion 111 shaped like a plug is inserted into the second connecting portion 211 shaped like a jack, so that the connector 110 of the charger 100 and the power receiving module 210 of the electric car 200 can connect with each other. Then, the electric car 200 is charged with power from the battery 140 provided inside the charger 100.

The coupling form between the connector 110 of the charger 100 and the power receiving module 210 of the electric car 200 is not limited to the structure described in FIGS. 5 and 6, but may have various structures capable of supplying power. In other words, FIGS. 5 and 6 illustrate an example that the plug is provided as the first connecting portion 111 in the connector 110 of the charger 100, and the jack is provided as the second connecting portion 211 in the power receiving module 210 of the electric car 200. Alternatively, the jack may be provided in the connector 110, and the plug may be provided in the power receiving module 210. Besides the connector 111 and the jack 112, other coupling structures may be used to supply the charging power.

Further, as necessary, the charging power may be supplied by, for example, energy transfer using an electromagnetic field or the like without direct connection between the charger 100 and the electric car 200.

Referring to FIG. 6, the charger 100 having the outer appearance of the second shape according to the first embodiment of the disclosure occupies a smaller area around the electric car 200 than the first shape because the second sub main body 102 enters under the electric car 200 during the charging. Therefore, there are no problems of obstructing traffic of other vehicles in a parking lot and the like common use space, or occupying surrounding parking spaces for other vehicles.

Figure 7:
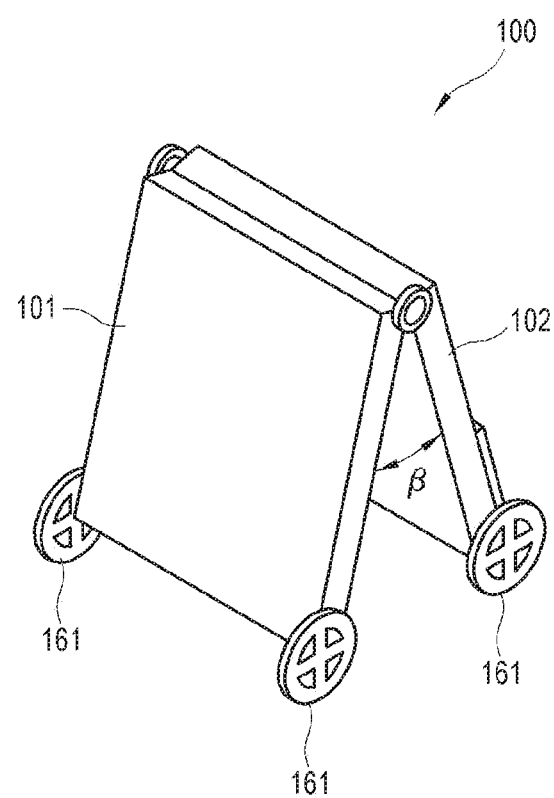
FIGS. 7 to 9 illustrate a first shape of a charger according to a second embodiment of the disclosure.
Figure 8:
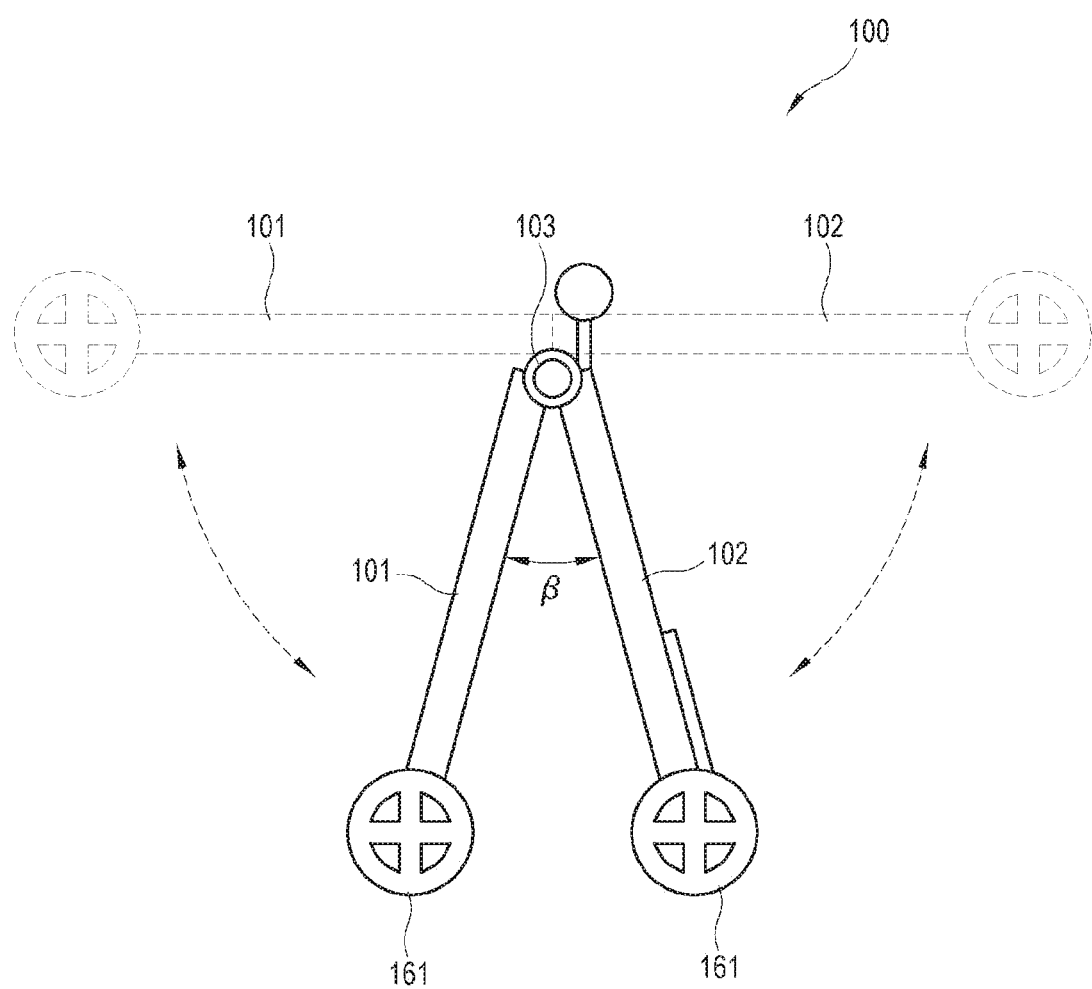
Figure 9:
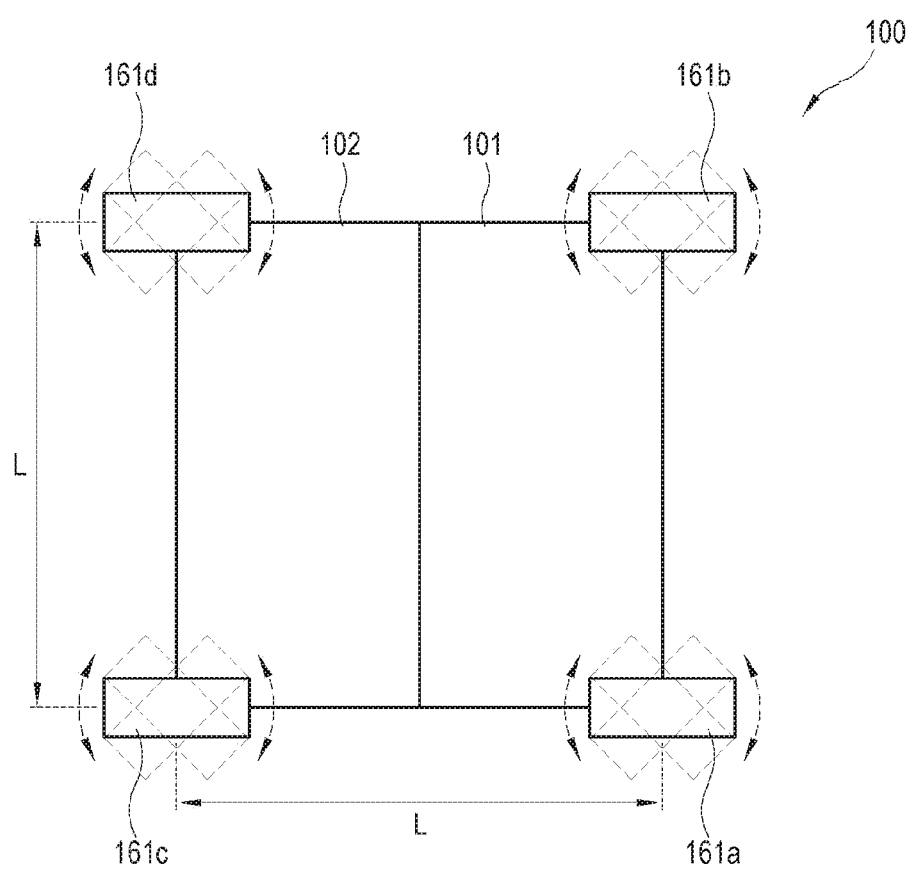

FIGS. 7 to 9 illustrate a first shape of a charger 100 according to a second embodiment of the disclosure, in which FIG. 7 is a perspective view of the charger 100 having the first shape, FIG. 8 is a front view of the charger 100 in FIG. 7, and FIG. 9 is a bottom view of the charger 100 in FIG. 7.

Figure 10:
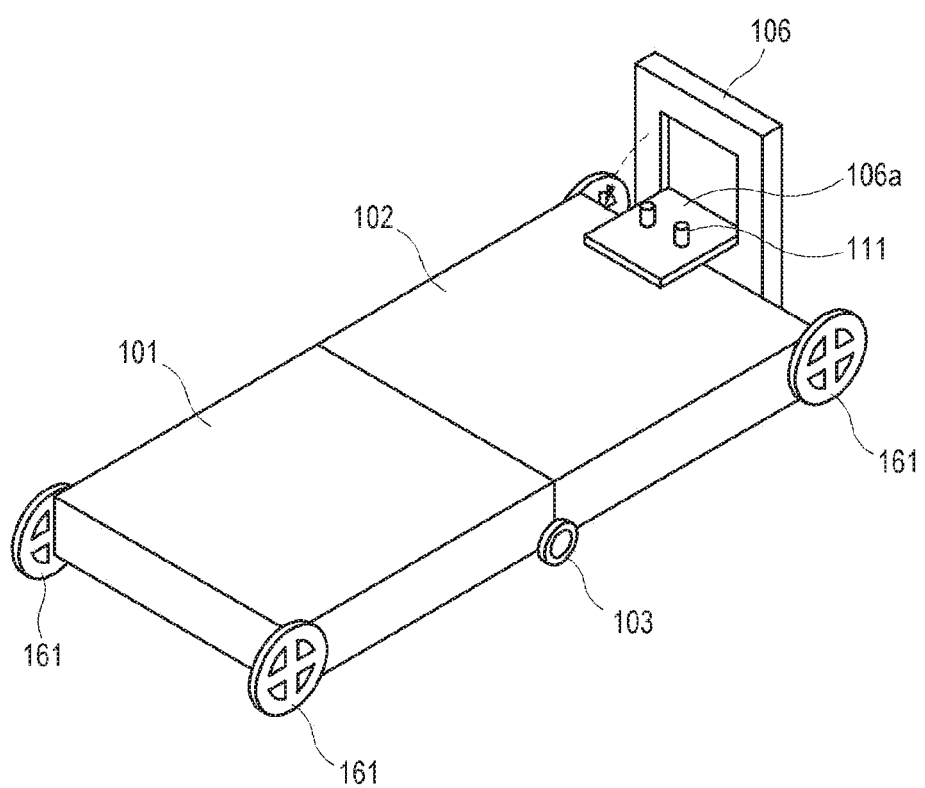
FIGS. 10 to 12 illustrate a second shape of the charger according to the second embodiment of the disclosure.
Figure 11:
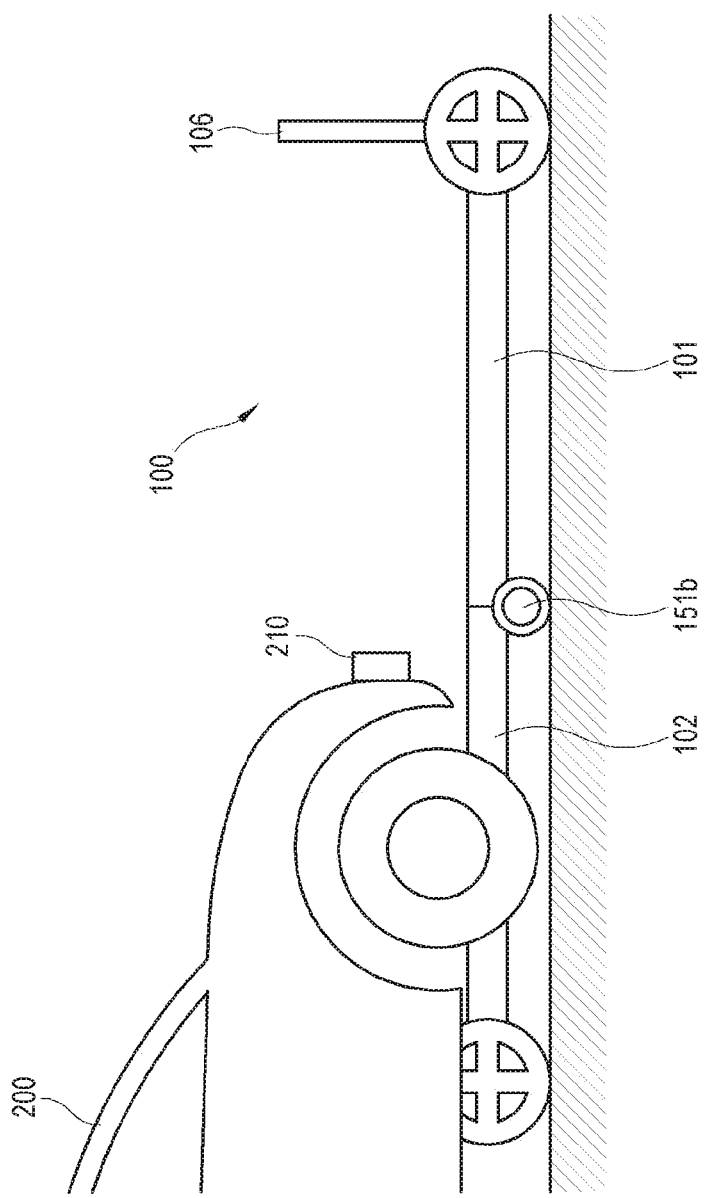
Figure 12:
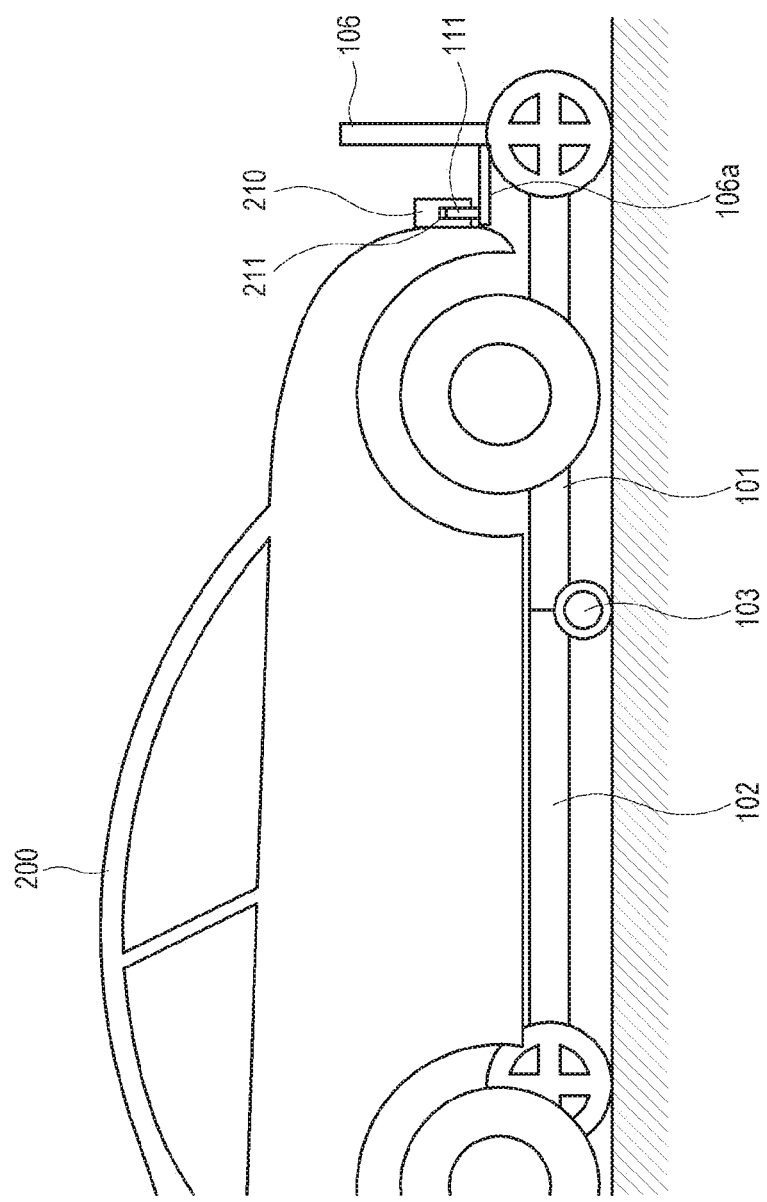

FIGS. 10 to 12 illustrate a second shape of the charger 100 according to the second embodiment of the disclosure, in which FIG. 10 is a perspective view of the charger 100 having the second shape, and FIGS. 11 and 12 are front views of the charger 100 in FIG. 10.

The charger 100 according to an embodiment of the disclosure includes a plurality of sub main bodies 101 and 102 of which relative positions are changed to alternate between a first shape and a second shape. For example, the charger 100 having the first shape may be switched over to the second shape as the plurality of sub main bodies 101 and 102 are gradually spaced apart from each other, or the charger 100 having the second shape may be switched over to the first shape as the plurality of sub main bodies 101 and 102 gradually come close to each other, which will be described later.

In the second embodiment, the plurality of main bodies includes a first sub main body 101, and a second sub main body 102 coupled to the first sub main body 101 as shown in FIGS. 7 to 12. The first sub main body 101 and/or the second sub main body 102 may be shaped like a flat plate. The first sub main body 101 and the second sub main body 102 has a thickness lower than the minimum ground clearance of a typical vehicle, for example, a thickness of about 100 mm, so as to enter under the electric car 200 while having the second shape.

In the charger 100 according to the second embodiment of the disclosure, the plurality of sub main bodies 101 and 102 are coupled each other to be rotatable with respect to a rotation axial line corresponding to each of first end portions thereof. The first sub main body 101 and the second sub main body 102 may selectively stand up depending on the rotation at a coupling portion 103 thereof.

According to an embodiment, a first end of the first sub main body 101 and a first end of the second sub main body 102, which are assembled into the coupling portion 103, may be provided with a hinge as a transformation unit 151. The hinge makes the first sub main body 101 and the second sub main body 102 be rotatably coupled with respect to the rotation axial line and locked at a predetermined angle of (β as shown in FIGS. 7 and 8.

According to the second embodiment, the charger 100 is switchable over between the first shape and the second shape by the rotation of the hinge provided in the main body as the transformation unit 151. The transformation unit 151 together with a transformation motor 152 is included in a transformer 150 to be described later.

As shown in FIGS. 7 and 8, the first shape according to the second embodiment corresponds to a shape where the sub main bodies 101 and 102 are relatively rotated with respect to the rotation axial line to get closer to each other, so that the sub main bodies 101 and 102 can be supported on the ground by second end portions thereof. In the first shape, the first sub main body 101 and the second sub main body 102 may stand up as each inclined at a predetermined angle β/2 while supporting each other. According to the second embodiment, the first shape of the charger 100 has an outer appearance similar to a triangle or an alphabetical character of "A", and thus the first shape may be also called an "A"-shape.

The charger 100 includes a wheel, i.e. the traveling wheel 161 for moving on the ground.

According to an embodiment, the charger 100 may be provided in such a manner that one pair of traveling wheels 161 is attached to each of the first sub main body 101 and the second sub main body 102 as shown in FIGS. 7 to 12.

The traveling wheel 161 together with a traveling motor 162 and a steerer 163 is included in the moving unit 160 (to be described later).

The charger 100 is changed in shape and size of a ground space occupied by the plurality of traveling wheels 161 as the hinge 154 rotates.

In the charger 100 having the first shape according to the second embodiment of the disclosure, as shown in FIG. 9, the first sub main body 101 and the second sub main body 102 are coupled and locked by the transformation unit 151, i.e. the hinge so as to have an angle corresponding to a position where a space occupied by four traveling wheels 161a, 161b, 161c and 161d has a square shape of which width and length are the same as 'L'.

The foregoing square is formed by virtually connecting the four traveling wheels 161a, 161b, 161c and 161d, and it is easy to control the direction of the moving charger 100, i.e. steer the moving charger 100 by controlling revolutions per minute (RPM) of each of the plurality of traveling wheels 161a, 161b, 161c and 161d. According to this embodiment, a steering effect is created by controlling each RPM of the moving wheels 161a, 161b, 161c and 161d without the steerer 163 for physically changing the angle of the moving wheel 161.

Meanwhile, the foregoing charger 100 having the first shape is changed in its outer appearance as switched over to the second shape as the first sub main body 101 and the second sub main body 102 are rotated outward as much as a predetermined angle with respect to the hinge 154.

Specifically, as shown in FIGS. 10 to 12, the second shape according to the second embodiment corresponds to a shape in which the sub main bodies 101 and 102 are relatively rotated with respect to the rotation axial line so that the sub main bodies 101 and 102 can be disposed on the same plane. In other words, the second shape of the charger 100 may correspond to a shape in which the second sub main body 102 shaped like a flat plate is disposed horizontally on the ground and the first sub main body 101 shaped like a flat plate is horizontally coupled to the second sub main body 102. According to the second embodiment, the second shape of the charger 100 has an outer appearance that the first sub main body 101 and the second sub main body 102 are coupled to have a cross section like a horizontal line or a Chinese character of "—", and thus the second shape may be also called a "—"-shape.

In the charger 100 having the second shape, as shown in FIGS. 11 and 12, the first sub main body 101 and the second sub main body 102 are horizontally disposed on the ground so as to enter under the electric car 200. Therefore, a connector 110 provided in a first side of the first sub main body 101 vertically stands up, and is then connected, i.e. docked to the power receiving module 210 of the electric car 200, thereby achieving charging for the electric car 200.

According to the second embodiment of the disclosure, the connector 110 is provided in the first sub main body 101. As shown in FIG. 10, the connector 110 may include a connector box 106 provided at the first side of the first sub main body 101. For example, the connector box 106 is provided with an openable connector cover 106a, and a plug may be provided as the first connecting portion 111 in the opened connector cover 106a. The power receiving module 210 of the electric car 200 is provided with a second connecting portion 211 to which the first connecting portion 111 is connectable, for example, a jack into which a plug is inserted and coupled.

The connector cover 106a is automatically opened/closed and height-controlled by a driving motor 112 (to be described later) so that the first connecting portion 111 and the second connecting portion 211 can couple with each other to thereby supply power to the electric car 200.

Specifically, as shown in FIG. 12, the plug corresponding to the first connecting portion 111 is inserted into the jack corresponding to the second connecting portion 211, so that the connector 110 of the charger 100 and the power receiving module 210 of the electric car 200 can connect with each other. Then, the electric car 200 is charged with power from the battery 140 provided inside the charger 100.

The coupling form between the connector 110 of the charger 100 and the power receiving module 210 of the electric car 200 is not limited to the structure described in FIGS. 10 and 12, but may have various structures capable of supplying power. Further, as necessary, the charging power may be supplied by, for example, energy transfer using an electromagnetic field or the like without direct connection between the charger 100 and the electric car 200.

Referring to FIGS. 11 and 12, the charger 100 having the outer appearance of the second shape according to the second embodiment of the disclosure occupies a smaller area around the electric car 200 than the first shape because the first sub main body 101 and the second sub main body 102 enter under the electric car 200 during the charging. Therefore, there are no problems of obstructing traffic of other vehicles in a parking lot and the like common use space, or occupying surrounding parking spaces for other vehicles.

Figure 13:
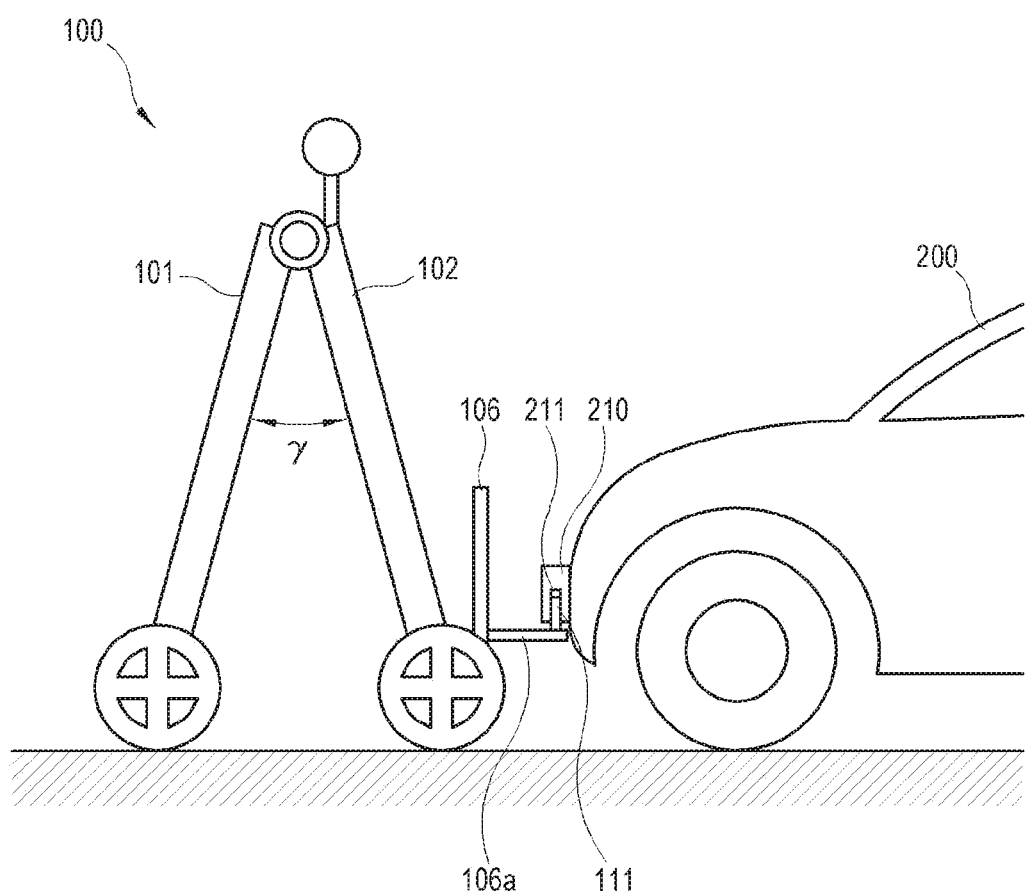
FIG. 13 illustrates a second shape of a charger according to a third embodiment of the disclosure.

FIG. 13 illustrates a second shape of a charger 100 according to a third embodiment of the disclosure, viewed from the front.

The charger 100 according to the third embodiment is the same first shape as the charger 100 according to the second embodiment, but different in the second shape corresponding to the outer appearance for charging the electric car 200 from the charger 100 according to the second embodiment.

Therefore, the description related to the first shape according to the second embodiment is equally applied to the first shape of the charger 100 according to the third embodiment, and details thereof will not be described to avoid repetitive description.

For the second shape according to the third embodiment, the first sub main body 101 and the second sub main body 102 of the charger 100 having the first shape as shown in FIGS. 7 and 8 are relatively rotated inward with respect to the rotation axial line, i.e. the first end portions of the sub main bodies 101 and 102 by the transformation unit 151, for example, the hinge, and thus the outer appearance is changed to have the second shape as show in FIG. 13.

Therefore, like the first shape, the second shape according to the third embodiment corresponds to a shape where the sub main bodies 101 and 102 are supported on the ground by second end portions thereof. That is, in the second shape according to the third embodiment, the first sub main body 101 and the second sub main body 102 may stand up as each inclined at a predetermined angle $\gamma/2$ while supporting each other. The second shape according to the third embodiment may be applied to a small car and the like of which the full length is short.

However, as compared with the first shape, the second shape is actualized by making the first sub main body 101 and the second sub main body 102 be rotated to come as close as possible and locked by the transformation unit 151, thereby further decreasing the area around the electric car 200 occupied by the main body. Therefore, there are no problems of obstructing traffic of other vehicles in a parking lot and the like common use space, or occupying surrounding parking spaces for other vehicles.

According to the third embodiment of the disclosure, the connector 110 may be provided in the first sub main body 101, and, as shown in FIG. 13, include the connector box 106 provided at the first side of the first sub main body 101. For example, the connector box 106 is provided with an openable connector cover 106a, and a plug may be provided as the first connecting portion 111 in the opened connector cover 106a. The power receiving module 210 of the electric car 200 is provided with a second connecting portion 211, i.e. a jack at a bottom side thereof, into which the first connecting portion 111, i.e. the plug is insertable.

Thus, as shown in FIG. 13, the first connecting portion 111, i.e. the plug is inserted in and coupled to the second connecting portion 211, i.e. the jack, so that the connector 110 of the charger 100 and the power receiving module 210 of the electric car 200 can connect with each other. Then, the electric car 200 is charged with power from the battery 140 provided inside the charger 100.

The coupling form between the connector 110 of the charger 100 and the power receiving module 210 of the electric car 200 is not limited to the structure described with reference to FIG. 13, but may have various structures as long as they can supply power. Besides the connector and the jack, other coupling structures may for example be used as the first and second connecting portions to supply the charging power. Further, as necessary, the charging power may be supplied by, for example, energy transfer using an electromagnetic field or the like without direct connection between the charger 100 and the electric car 200.

Figure 14:
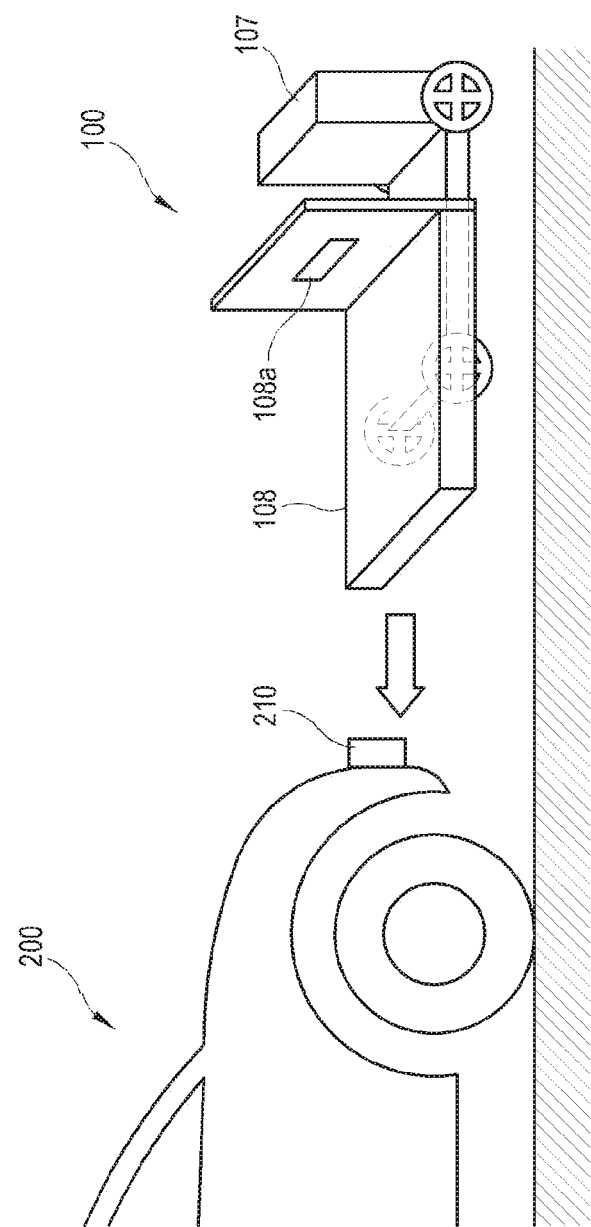
FIG. 14 illustrates a second shape of a charger according to a fourth embodiment of the disclosure.

FIG. 14 illustrates a second shape of a charger 100 according to a fourth embodiment of the disclosure, viewed from the front.

The charger 100 according to the fourth embodiment is different from the foregoing chargers 100 according to the first to third embodiments in that a rechargeable battery is separable from the main body of the charger 100 that moves to the position of the charging target, i.e. the electric car 200.

In the fourth embodiment, the charger 100 having the first shape is provided in such a form that a second sub main body 108 including a rechargeable battery is coupled to the first sub main body 107, and moved to the position of the electric car 200, i.e. the charging target by the traveling wheel 161. In addition, as shown in FIG. 14, the second sub main body 108 including the rechargeable battery is separated from the first sub main body 107 that is used for the movement, and thus the outer appearance of the charger 100 is switched over from the first shape to the second shape.

In the charger 100 having the second shape, as shown in FIG. 14, the second sub main body 108 separated from the first sub main body 107 enters under the electric car 200.

According to the fourth embodiment of the disclosure, the connector 110 for charging the electric car 200 is provided in the second sub main body 108 including the rechargeable battery, and, as shown in FIG. 14, the first connecting portion 111, e.g. a plug may be provided on an openable connector cover 108a of a flat plate portion standing on the top of the second sub main body 108. On the bottom of the power receiving module 210 of the electric car 200, a jack is provided as the second connecting portion 211 into which the first connecting portion 111, i.e. the plug is insertable.

The connector cover 108a is automatically opened/closed and height-controlled by a driving motor 112 (to be described later) so that the first connecting portion 111 and the second connecting portion 211 can couple with each other.

Thus, the plug is inserted in and coupled to the jack, so that the connector 110 of the charger 100 and the power receiving module 210 of the electric car 200 can connect with each other. Then, the electric car 200 is charged with power from the battery 140 provided inside the charger 100.

In the foregoing charger 100 having the outer appearance of the second shape corresponding to the charging mode according to the first to fourth embodiments, the area around the charging target, i.e. the electric car 200, occupied by the main body is smaller than that of the charger having the outer appearance of the first shape corresponding to the traveling mode. Therefore, it is advantageous to solve problems of obstructing traffic of other vehicles while the electric car 200 is being charged in a parking lot and the like common use space, or occupying surrounding parking spaces for other vehicles.

Below, the power receiving module 210 installed in the electric vehicle 200 according to an embodiment of the disclosure will be described with reference to the accompanying drawings.

Figure 15:
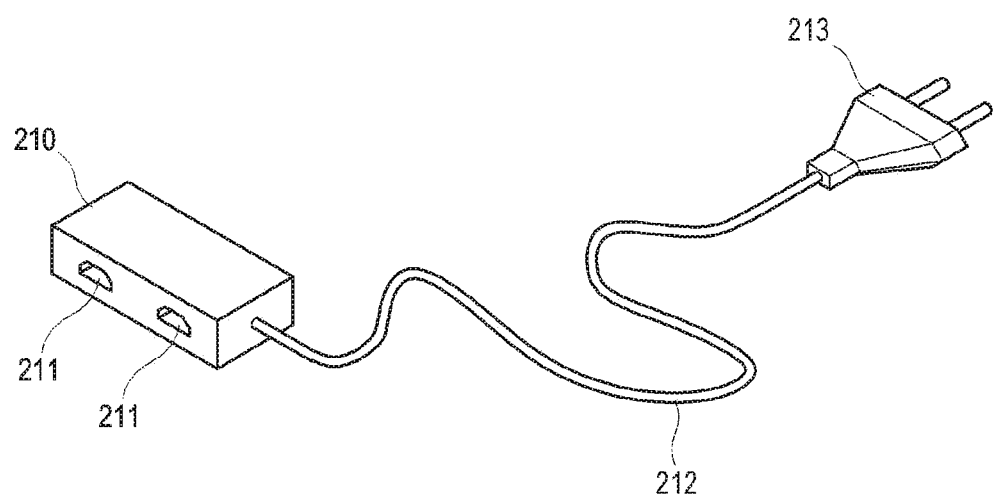
FIGS. 15 and 16 illustrate a power receiving module according to the first embodiment of the disclosure.
Figure 16:
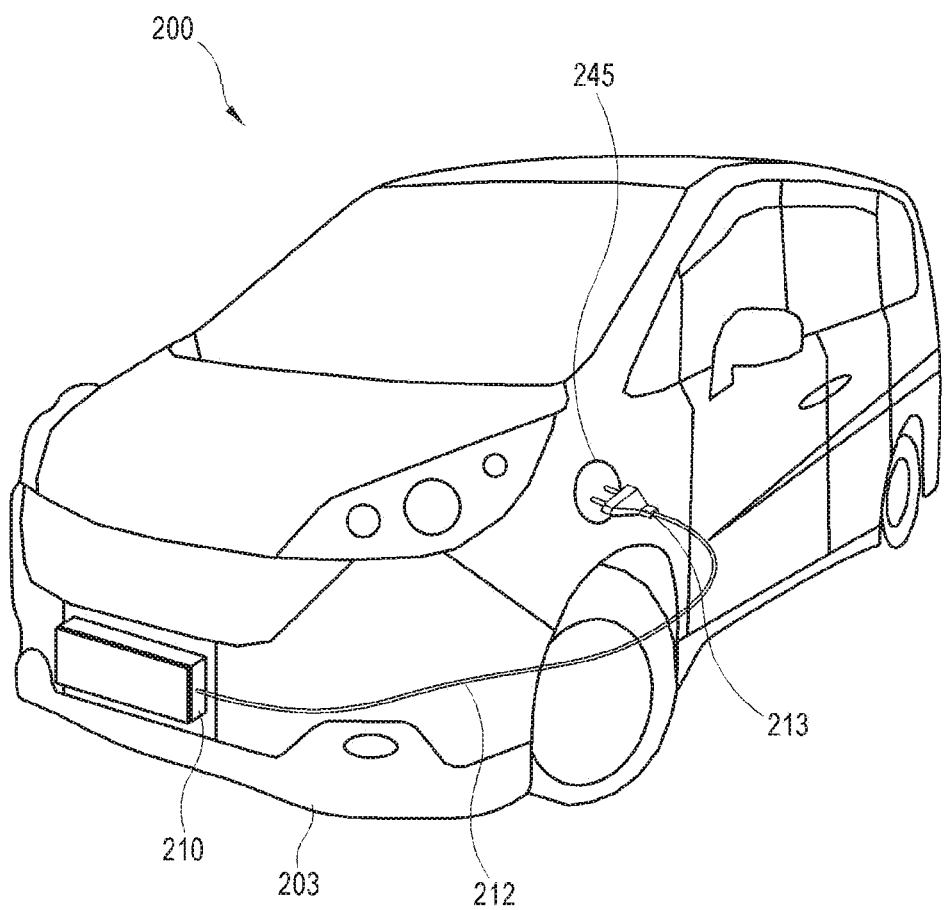

FIGS. 15 and 16 illustrate the power receiving module 140 according to the first embodiment of the disclosure.

As shown in FIG. 15, the power receiving module 210 provided in the electric car 200 is formed with the jack as at least one second connecting portion 211 into which the plug, i.e. the first connecting portion 111 in the connector 110 of the charger 100 is inserted and coupled. According to an embodiment, the second connecting portion 211 may be provided at a lower side, i.e. on the bottom of the power receiving module 210.

The power receiving module 210 includes a charging cable 212 for supplying the charging power as connected to a charging terminal (or a socket) 245 of the electric car 200. The charging cable 212 may be provided with a plug 213 at one end thereof. The plug 213 is connected to the charging terminal 245 of the electric car 200, so that the charging power can be supplied from the charger 100 to a battery 240 of the electric car 200 through the power receiving module 210 and the charging terminal 245.

Here, the power receiving module 210 is internally provided with a cord reel (or an automatic cord reel or an automatic cable winder) into and from which the charging cable 212 and the plug 213 are tucked and pull out, so that the cable 212 and the plug 213 can be tucked into the power receiving module 210 when not in use.

According to the first embodiment, the power receiving module 210 may be detachably provided on the front or rear side of the electric car 200.

For example, the power receiving module 210 may be attached to or detached from a license plate 202, a bumper 203, etc. provided on the front or rear side of the electric car 200. FIG. 16 illustrates an example that the detachable power receiving module 210 is attached to the license plate 202 on the front side of the electric car 200.

Here, the power receiving module 210 may for example be attached to the license plate 202 based on magnetic attraction between magnets having opposite polarity. In this embodiment, the method of detachably coupling the power receiving module 210 with the license plate 202 or the bumper 20 is not limited to the magnetic attraction, but there may be used various methods where attachment and detachment are easy.

According to an embodiment, a sensing unit (see '230' in FIG. 20) including at least one sensor 232 for detecting the approach of the charger 100 may be further provided on the front or rear side of the electric car 200.

Figure 17:
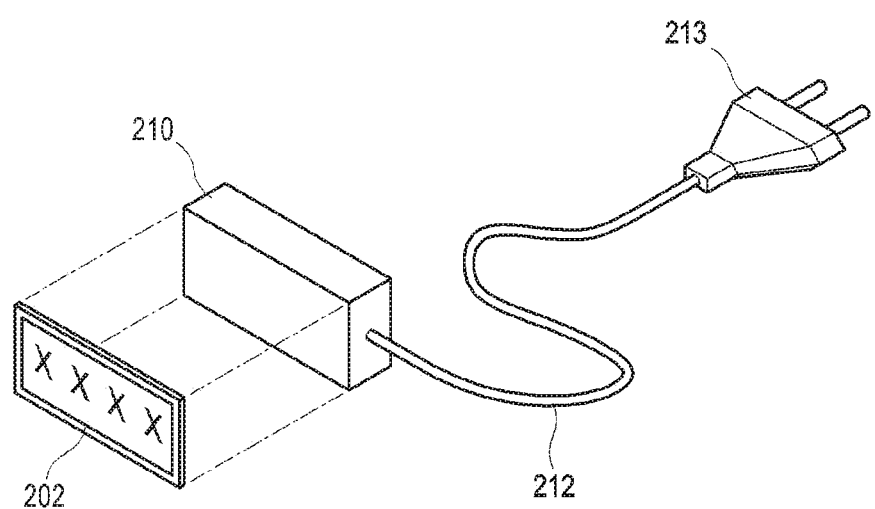
FIGS. 17 and 18 illustrate a power receiving module according to the second embodiment of the disclosure.
Figure 18:
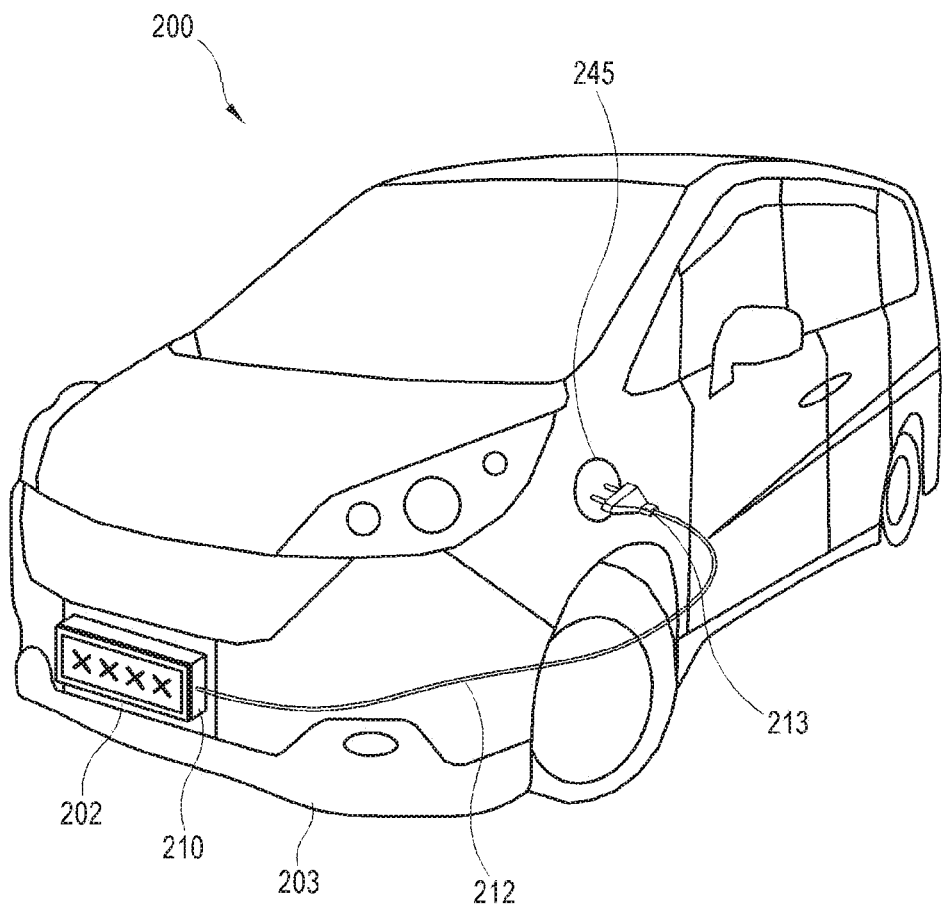

Meanwhile, FIGS. 17 and 18 illustrate the power receiving module 210 according to the second embodiment of the disclosure.

As shown in FIG. 17, the power receiving module 210 provided in the electric car 200 is formed with the jack as at least one second connecting portion 211 into which the plug, i.e. the first connecting portion 111 in the connector 110 of the charger 100 is inserted and coupled.

The power receiving module 210 includes a charging cable 212 for supplying the charging power as connected to a charging terminal (or a socket) 245 of the electric car 200. The charging cable 212 may be provided with a plug 213 at one end thereof. The plug 213 is connected to the charging terminal 245 of the electric car 200, so that the charging power can be supplied from the charger 100 to a battery 240 of the electric car 200 through the power receiving module 210 and the charging terminal 245.

Here, the power receiving module 210 is internally provided with a cord reel (or an automatic cord reel or an automatic cable winder) into and from which the charging cable 212 and the plug 213 are tucked and pull out, so that the cable 212 and the plug 213 can be tucked into the power receiving module 210 when not in use.

According to the second embodiment, the power receiving module 210 is provided at a predetermined position on the front or rear side of the electric car 200.

For example, the power receiving module 210 may be installed on a license plate 202, a bumper 203, etc. provided on the front or rear side of the electric car 200. FIG. 18 illustrates an example that the power receiving module 210 is installed on the front of the electric car 200 and then the license plate 202 is attached to the power receiving module 210.

Typically, a vehicle is mounted with a license plate guard as a structure attached between a bumper and a license plate. In this embodiment, the power receiving module 210 may be mounted to the license plate guard. For example, a position of the bumper 203, at which the license plate 202 will be mounted, is processed to secure an installation space for the power receiving module 210, and the power receiving module 210 is installed at the secured. Then, the license plate 202 is attached to the power receiving module 210. In this embodiment, there are no limits to a method of attaching the license plate 202 to the power receiving module 210, and thus various coupling methods may be used in between.

According to an embodiment, the sensing unit (see '230' in FIG. 20) including at least one sensor 232 for detecting the approach of the charger 100 may be further provided on the front or rear side of the electric car 200.

Figure 19:
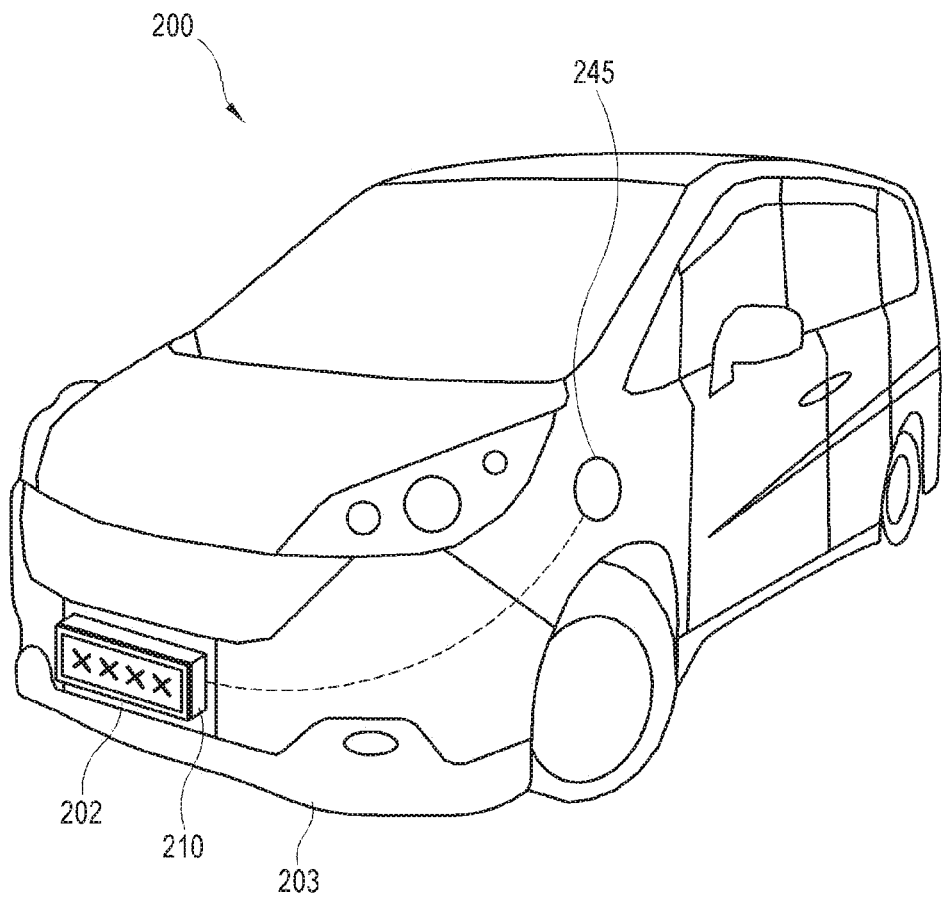
FIG. 19 illustrates a power receiving module according to the third embodiment of the disclosure.

Meanwhile, FIG. 19 illustrates the power receiving module 210 according to the third embodiment of the disclosure.

Like the second embodiment, the power receiving module 210 according to the third embodiment shown in FIG. 19 is provided at a predetermined position on the front or rear side of the electric car 200.

Referring to FIG. 19, the power receiving module 210 according to the third embodiment is different from that of the second embodiment in that a cable 212 and a plug 213 are not exposed to the outside but directly connected to a battery charging circuit through the inside of the electric car 200. Therefore, the descriptions related to the second embodiment are equally applied to the configurations except the cable 212 and the plug 213 of the power receiving module 210 according to the third embodiment, and thus details thereof will not be described to avoid repetitive descriptions.

In the foregoing power receiving module 210 according to the third embodiment, the cable 212 and the plug 213 are directly connected to the battery charging circuit through the inside of the electric car 200, and thus a user does not have to insert the plug 213 into the terminal 210 for charging.

According to various embodiments as described above, the charger 100 is connected to the power receiving module 210 of the electric vehicle 200 by various shapes/methods, thereby providing a charging service from the charger 100 to the electric car 200.

Below, a process of providing the charging service to the electric car 200 will be described in more detail with reference to the accompanying drawings.

FIG. 20 is a block diagram showing configurations of a charger 100 and an electric vehicle 200 according to an embodiment of the disclosure.

As shown in FIG. 20, the charger 100 according to an embodiment of the disclosure includes a connector 110, a communicator 120, a sensing unit 130, a battery 140, a transformer 150, a moving unit 160, a storage 170, and a controller 180.

The connector 110 is used as an interface for connecting the charger 100, which serves as a source for supplying the charging power to the electric car 200, with the charging terminal 245 provided in the electric car 200. According to an embodiment, the connector 110 is connected to the charging terminal 245 through the power receiving module 210 mounted to the electric car 200, thereby supplying the charging power to the electric car 200.

As described above, the connector 110 may be provided in a first sub main body 101 of the charger 100, and include a first connecting portion 111. The first connecting portion 111 is connected to a second connecting portion 211 provided in the power receiving module 210 of the electric car 200, so that the charging power can be supplied from the charger 100 to the electric car 200.

According to an embodiment, the connector 110 may further include a driving motor 112 for driving a connector cover 105, 106a, 108a provided in the first sub main body 101.

The driving motor 112 opens/closes the connector cover 105, 106a, 108a under control of the controller 180, and finely adjust the position (e.g. height) of the connector cover 105, 106a, 108a so that the first connecting portion 111 provided in the opened connector cover 105, 106a, 108a can be inserted in and coupled to the second connecting portion 211.

According to an embodiment, the charger 100 may receive electric power from a power supplying connector 610 of a charging station 600 through the first connecting portion 111 of the connector 110. The charging station 600 may use a power infra structure previously installed in a parking lot, and may include quick charging facilities.

The controller 180 controls the charger 100 located in the charging station 600 to receive the electric power from the power supplying connector through the charging connector 110 of the charger 100, thereby charging the battery 140 with the electric power.

The communicator 120 communicates with at least one external device. The external device with which the communication is possible includes at least one among the electric car 200, a user terminal apparatus 300, and the server 400. Here, the user terminal apparatus 300 may include a smart phone that an owner, a driver or an operator of the electric car 200 has, and a device, e.g. a navigation system, etc. previously installed in the electric car 200, and the communicator 120 may transmit and receive data to and from the plurality of terminal apparatuses 300.

The communicator 120 may receive a charging request for the electric vehicle 200 from at least one among the user terminal apparatus 300, the server 400, the power receiving module 210, and the electric vehicle 200. Here, the communicator 120 may receive the charging request from an element (e.g. the navigation system installed inside the car) other than the power receiving module 210 of the electric car 200.

According to an embodiment, the communicator 120 includes a short-range communicator, and the short-range communicator may be provided to support wireless short-range communication between the charger 100 and other devices without an access point (AP) under control of the controller 180.

The short-range communicator may include at least one among short-range communication modules for Bluetooth, Bluetooth low energy, infrared data association (IrDA), Wi-Fi Direct, Zigbee, ultra-wideband (UWB), near field communication (NFC), etc.

According to an embodiment, the communicator 120 may further include a wireless local area network (WLAN) unit. Under control of the controller 180, the WLAN unit may wirelessly connect with the AP at a place where the AP is installed. The WLAN unit may include a Wi-Fi communication module.

According to an embodiment, the communicator 120 may further include a mobile communicator. The mobile communicator may use one or at least two antennas (not shown) to connect with an external device, i.e. another device through mobile communication, under control of the controller 180. The mobile communicator transmits/receives a wireless signal for data communication with a mobile phone, a smart phone, a tablet computer, a wearable device, or the like connectable with the charger 100. A wireless signal emitted from the mobile communicator is transmitted to the other receiving party through long-term evolution (LTE), $3^{rd}$ generation (3G), $4^{th}$ generation (4G), or the like mobile communication network.

According to an embodiment of the disclosure, the communicator 120 of the charger 100 may include one or combination of two among the short-range communicator, the WLAN unit, and the mobile communicator in accordance with performance.

Meanwhile, according to an embodiment, the communicator 120 may further include a global positioning system (GPS) unit (not shown). The GPS unit periodically receives information (e.g. correct position information and time information of a GPS satellite receivable in the charger 100) from a plurality of GPS satellites on the earth's orbit. The charger 100 may identify the position, speed and/or time of the charger 100 based on information received from the plurality of GPS satellites. Alternatively, under a condition such as an indoor condition that a GPS satellite signal is not received, a beacon (not shown) or the like indoor position measuring means, map data stored in the charger 100, and information detected by the sensing unit 130 may be used to autonomously trace the position.

The sensing unit 130 includes a camera 131 or at least one sensor 132 to detect surrounding environments of the charger 100. The controller 180 may control the movement of the charger 100 by applying detection data received from the camera 131 or the sensor 132 to a trip algorithm or map stored in the storage 170.

The camera 131 may be installed at an upper portion of the charger 100 having the first shape for movement, and capture a still image or a moving image under control of the controller 180. According to an embodiment, the camera 131 may for example be mounted to the top of the first sub main body 101 which is standing up. Further, the camera 131 may further include an auxiliary light source (for example, a flash) to provide light, the amount of which is needed for the camera 131 to capture an image.

The controller 180 may control the electric car 200 to autonomously travel based on an image captured by the camera 131. For example, the controller 180 of the traveling charger 100 controls the camera 131 to capture the surroundings on a traveling path, detects an obstacle such as other vehicles, pedestrians, animals, bicycles and the like transports, things, etc. based on the captured image, and controls the moving unit 160 to make the charger 100 move avoiding the detected obstacle or stop moving.

According to an embodiment, the image captured by the camera 131 may be stored in the storage 170 or the server 400, and used as a ground for identifying negligence when a collision or the like accident occurs.

According to an embodiment, the image captured by the camera 131 may be transmitted to a device having a remote-control function like the user terminal apparatus 300 through the communicator 120. Through the image captured at a remote place, a user may remotely control the charger 100 to move. Here, the camera 131 may be actualized by a 360-degrees camera.

The sensor 132 includes a proximity sensor to detect approach to the charger 100, thereby detecting an approaching or moving object (e.g. an obstacle such as other vehicles, pedestrians, animals, bicycles and the like transports, things, etc.) Based on the detection results of the sensor 132, the controller 180 may control the moving unit 160 to make the charger 100 move avoiding the detected obstacle or stop moving.

According to an embodiment, the controller 180 may control the movement of the charger 100 by applying the detection data of the camera 131 or the sensor 132 to the trip algorithm or map stored in the storage 170.

According to an embodiment, the sensor 132 may further include a motion sensor, and the motion sensor may include a gyroscope or a three-axial or six-axial acceleration sensor as a sensor to detect the movement (including the posture and direction) of the apparatus 100. The controller 180 may further measure acceleration of the charger 100, in which the acceleration of gravity is added to the acceleration of movement, based on the detection data of the motion sensor.

At least one sensor 132 included in the sensing unit 130 detects the surroundings of the charger 100, generates a signal corresponding to the detection, and transmits the generated signal to the controller 180. It will be easily understood by a person having an ordinary skill in the art that the sensor 132 of the sensing unit 130 may be added or removed in accordance with the performance of the charger 100.

The battery 140 is provided in the main body of the charger 100, and charged with the charging power received through the connector 110. The power charged in the battery 140 is supplied to the electric car 200 through the connector, and used in charging the built-in battery of the electric car 200.

According to an embodiment, the battery 140 of the charger 100 may be charged with power received by the charging station 600 in a time slot during which power consumption is low, for example, in a midnight slot, i.e. may be charged with late-night power. Therefore, the battery 140 is relatively inexpensively charged with power, and the power charged in the battery 140 of the charger 100 is supplied to the electric car 200 at a cost corresponding to a usual time slot, thereby making a charging service provider create a profit.

Alternatively, the charging service provider may select a time slot or power goods corresponding to the lowest rate in terms of purchasing electricity in accordance with the rate fixed by an electricity seller, so that the battery 140 of the charger 100 can be charged at a cost as low as possible.

According to an embodiment, the battery 140 may be provided with a sensor for detecting a remaining charge, and thus the controller 180 may identify remaining charge information of the battery.

The transformer 150 makes the main body of the charger 100 be alternately switched over between the first shape and the second shape under control of the controller 180. The first shape and the second shape are equivalent to those described with the foregoing charger 100 according to the first to fourth embodiments.

The transformer 150 includes the transformation unit 151 to make the main body of the charger 100 be switched over, i.e. transformed between the first shape and the second shape, and the transformation motor 152 to provide a driving force for the switching operation of the transformation unit 151.

According to an embodiment, the transformation unit 151 may include the guide rail 151*a* and the transformation wheel as described above.

Alternatively, the transformation unit 151 may include the hinge using the first end portions of the first main body 101 and the second main body 102 as the rotation axial line as described above.

The moving unit 160 may be provided in the main body of the charger 100, and makes the main body be movable. The main body of the charger 100 may move on the ground by the moving unit 160 in the mode of the first shape.

The controller 180 controls the moving unit 160 to move the main body of the charger 100 to a charging position of the electric car 200 in response to the charging request for the electric car 200.

The moving unit 160 may include the plurality of traveling wheels 161 mounted to the main body of the charger 100, the traveling motor 162 providing the force to drive the traveling wheels 161, and the steerer 163 configured to change the steering angle of the traveling wheel 161. The steerer 163 generally steers the traveling wheel 161 headed in the traveling direction under control of the controller 180, and moves the charger 100 to a desired position by differently controlling the steering angles of the left and right traveling wheels 161 when going around a curve. According to an embodiment, without the steerer 163 for physically changing the angle of the traveling wheel 161, the traveling direction of the moving charger 100 may be controlled, i.e. steered by controlling each RPM of the traveling wheels 161*a*, 161*b*, 161*c* and 161*d*.

Further, the moving unit 160 may make the main body of the charger 100 switched over to the second shape at least partially enter under the chassis of the electric car 200 so as to charge the electric car 200 under control of the controller 180.

The storage 170 may be configured to store a signal or data input/output corresponding to the operations of the connector 110, the communicator 120, the sensing unit 130, the transformer 150 and/or the moving unit 160 under control of the controller 180. The storage 170 may be configured to store a control program for controlling the charger 100, an application provided by a manufacturer or downloaded from the outside, detection data obtained by the sensing unit 130, or related data.

According to an embodiment, the storage 170 may be configured to store the trip algorithm of the charger 100, and the map of the installation space for the charger 100. The trip algorithm and the map may be previously stored while the charger 100 is installed, and stored/updated by data communication and the like using the communicator 120.

According to an embodiment, when the charger 100 is installed for the first time, the charger 100 may produce a map of an installation space while traveling in the space by the moving unit 160. The controller 180 may use the detection data obtained by the camera 131 and the sensor 132 in mapping, and may receive data obtained by scanning an architectural drawing, information about entrances and exits, etc. from the outside as necessary.

Such a map may be transmitted to the user terminal apparatus 300 or the server 400 through the communicator 120 and shared with a user and/or a manager. Further, an updated map, an updated trip algorithm, etc. may be received from the terminal apparatus 300 or the server 400 through the communicator 120.

The controller 180 includes at least one processor for loading and executing a program containing instructions, and a memory stored with the program. The memory may include a read only memory (ROM) in which a control program is stored to control the charger 100, and a random-access memory (RAM) used as a storage area for various jobs performed in the charger 100.

The controller 180 may control general operations of the charger 100 and flow of signals between the internal elements 110 to 170 of the charger 100, and process data.

When the charging request for a predetermined electric car 200 is received through the communicator 120, the controller 180 controls the moving unit 160 so that the charger 100 can move to a position connectable with a charging target, i.e. the electric car 200, and controls the transformer 150 to switch the main body of the charger 100 over from the first shape to the second shape to charge the electric car 200.

When the charger 100 is positioned to be connectable with the charging target, i.e. the electric car 200, the controller 180 controls the driving motor 112 of the connector 110 so that the first connecting portion 111 can be connected to the second connecting portion 211 of the power receiving module 210 provided in the electric car 200, and controls the power charged in the battery 140 to be supplied to the electric car 200 through the first connecting portion 111.

Further, the controller 180 controls the driving motor 112 under the condition that the charger 100 is positioned at the charging station 600, thereby controlling the first connecting portion 111 to be connected to the power supplying connector 610, and charging the battery 140 with the power received through the first connecting portion 111.

Further, the controller 180 may control the detection data obtained by the sensing unit 130 to be stored in the storage 170 and/or transmitted to the outside through the communicator 120, and control the traveling unit 160 to move the charger 100 in accordance with surrounding environments by applying the detection data to the trip algorithm, the map, and the like data stored in the storage 170.

The controller 180 controls power to be supplied to the internal elements 110 to 130, 150, 160 and 170. The internal elements may receive power from the battery 140, or the charger 100 may additionally include a separate power supply as necessary.

In response to a user's input or when a setting condition is satisfied, the controller 180 may execute an operating system (OS) and various programs/applications/software stored in the storage 170.

The processor may include at least one general-purpose processor such as a central processing unit (CPU), an application processor (AP), and a microcomputer (MI-COM), and, for example, load and execute a program corresponding to a predetermined algorithm from the ROM to the RAM 113, thereby implementing various operations of the charger 100.

The processor may include a single core, a dual core, a triple core, a quad core, or other multiple cores. The processor may include a plurality of processors, for example, a main processor and a sub processor. The sub processor is provided to operate in a standby mode (or a sleep mode) where the charger 100 receives only standby power and does not perform at least some functions.

The processor, the ROM, and the RAM may connect with one another through an internal bus.

Meanwhile, according to an alternative embodiment of the disclosure, the controller 180 may further include a program for implementing a specific function supported in the charger 100, for example, a function for detecting an error in certain elements including the main processor, and a chip provided as a processor dedicated for executing the program, for example, an integrated circuit (IC) chip.

Below, the configuration of the electric vehicle 200 will be described.

As shown in FIG. 20, the electric vehicle 200 according to an embodiment of the disclosure includes the power receiving module 210 which includes the second connecting portion 211, the charging cable 212, and the plug 213; the charging terminal 245; and the battery 240. The power receiving module 210 receives power from the charger 100 through the second connecting portion 211 connected to the first connecting portion 111 of the charger 100, and the supplied power is supplied to the charging terminal 245 through the cable 212 and the plug 213 for charging, thereby charging the battery 240.

As described above, the power receiving module 210 may be installed on the front or rear side of the electric car 200, and may be detachable.

According to an embodiment, the power receiving module 210 may further include a communicator 220 and a controller 280.

The communicator 220 performs communication with at least one external device. The external device with which the communication is possible includes at least one among the charger 100, the user terminal apparatus 300, and the server 400. Here, the user terminal apparatus 300 may include a smart phone that an owner, a driver or an operator of the electric car 200 has, and a device, e.g. a navigation system, etc. previously installed in the electric car 200, and the communicator 120 may transmit and receive data to and from the plurality of terminal apparatuses 300.

According to an embodiment, the communicator 220 includes a short-range communicator, and the short-range communicator may be provided to support wireless short-range communication between the power receiving module 210 and other devices without an access point (AP) under control of the controller 280.

The short-range communicator may include at least one among short-range communication modules for Bluetooth, Bluetooth low energy, IrDA, Wi-Fi Direct, Zigbee, UWB, NFC, etc.

According to an embodiment, the communicator 220 may further include a WLAN unit. Under control of the controller 280, the WLAN unit may wirelessly connect with the AP at a place where the AP is installed. The WLAN unit may include a Wi-Fi communication module.

According to an embodiment, the communicator 220 may further include a mobile communicator. The mobile communicator may use one or at least two antennas (not shown) to connect with an external device, i.e. another device through mobile communication, under control of the controller 280. The mobile communicator transmits/receives a wireless signal for data communication with a mobile phone, a smart phone, a tablet computer, a wearable device, or the like. A wireless signal emitted from the mobile communicator is transmitted to the other receiving party through LTE, 3G, 4G, or the like mobile communication network.

According to an embodiment of the disclosure, the communicator 220 of the power receiving module 210 may include one or combination of two among the short-range communicator, the WLAN unit, and the mobile communicator in accordance with performance.

Meanwhile, according to an embodiment, the communicator 220 may further include a GPS unit (not shown). The GPS unit periodically receives information (e.g. correct position information and time information of a GPS satellite receivable in the power receiving module 210) from a plurality of GPS satellites on the earth's orbit. The power receiving module 210 may identify the position, speed and/or time of the power receiving module 210 based on information received from the plurality of GPS satellites. Alternatively, under a condition such as an indoor condition that a GPS satellite signal is not received, a beacon (not shown) or the like indoor position measuring means may be used, statistical data based on information about detailed positions where the electric car 200 has mostly been parked may be analyzed, or a user may register related information through the application.

According to an embodiment, the electric car 200 or the power receiving module 210 may further include the sensing unit 230 including at least one sensor 232 to detect surrounding environments.

According to an embodiment, the sensing unit 230 may be provided in the power receiving module 210.

The sensor 232 may include a proximity sensor to detect approach to the charger 100. Based on the detection data of the sensor 232, the controller 280 may identify the approach of the charger 100.

According to an embodiment, the controller 280 may connect with a camera (not shown) previously installed on the front or rear side of the electric car 200 through the communicator 220, and may further use an image captured by the camera in detecting an object such as the charger 100.

For example, the controller 280 detects the approach of the charger 100 with the sensor 232 or the camera, and informs the user terminal apparatus 300 of the approach of the charger 100 through the communicator 220.

At least one sensor 232 included in the sensing unit 230 detects the surroundings of the electric vehicle 200, and generates and transmits a signal corresponding to the detection to the controller 280. There are no limits to the position where the sensor 232 of the sensing unit 230 is installed, and It will be easily understood by a person having an ordinary skill in the art that the sensor 232 may be added or removed.

The battery 240 is provided inside the electric car 200, and charged with power received from the charger through the power receiving module 210 and the charging terminal 245.

According to an embodiment, the battery 240 may be provided with a sensor configured to detect a charging level, so that the controller 280 can identify remaining charge information of the battery 240.

According to an embodiment, when the controller 280 identifies that the remaining charge of the battery is lower than a predetermined reference level, a command, i.e. a signal corresponding to a charging request for the electric car 200 may be transmitted to the charger 100 through the communicator 220. Here, the charging request signal may be directly transmitted to the charger 100, or may be transmitted to the charger 100 via the user terminal apparatus 300 or the server 400.

The controller 280 may control flow of signals between the elements of the electric vehicle, such as the communicator 220 and the sensing unit 230, and implement a function for processing data.

According to an embodiment, the controller 280 includes at least one processor for loading and executing a program containing instructions, and a memory stored with the program. The memory may include a ROM in which a control program is stored to control the power receiving module 210, and a RAM used as a storage area for various jobs performed in the power receiving module 210. The processor may for example be actualized by a MICOM, an IC chip, etc.

In the embodiment of the disclosure shown in FIG. 20, the communicator 220 and the controller 280 are provided in the power receiving module 210 by way of example, but the disclosure is not limited to this embodiment. According to alternative embodiment, the communicator 220 and/or the controller 280 may be provided in a separate mechanical element (e.g. a control device) connected to the power receiving module 210.

According to an embodiment, the power receiving module 210 includes a built-in card reader for direct payment of charging expenses. In this case, the card reader may include an NFC module.

Figure 21:
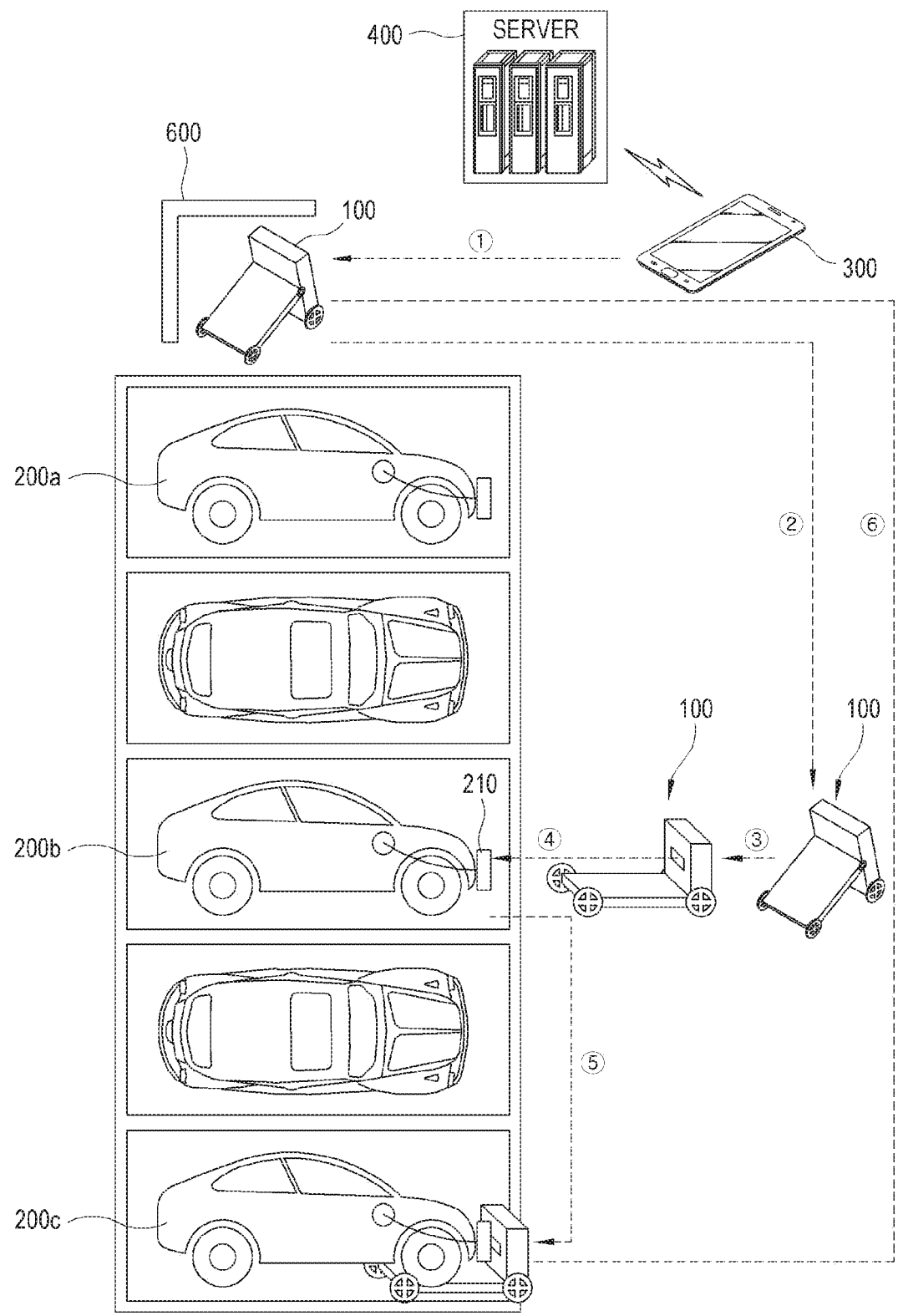
FIG. 21 is a view for explaining an example that an electric vehicle is charged by a movable and transformable charger according to an embodiment of the disclosure.

FIG. 21 is a view for explaining an example that the electric vehicle 200 is charged by a movable and transformable charger 100 according to an embodiment of the disclosure.

As shown in FIG. 21, the charger 100 is installed in a parking lot or the like including the charging station 600, where a plurality of vehicles can park. FIG. 21 illustrates that three electric cars 200*a*, 200*b* and 200*c* are parked in a parking lot, by way of example.

The charger 100 may produce a map of an installation space based on learning while moving (i.e. travelling) in the parking lot, i.e. the installation space for a predetermined period or periodically after being installed for the first time. Here, the map may be previously stored in the storage 170 of the charger 100 when it is installed, and periodically updated. Further, the controller 180 may store/update the map with a map received from the external server 400 or the like through the communicator 120.

A user, e.g. a driver, an operation, a family, etc. of the electric car 200*a*, 200*b*, 200*c* may download and install an application of providing an electric car charging service in his/her own terminal apparatus 300, for example, a smart phone, and execute the installed application to register information about the electric car 200*a*, 200*b*, 200*c* desired to receive the charging service. Here, the information to be registered may include information about the positions where the electric cars 200*a*, 200*b* and 200*c* have been mostly parked, and the registered information may be transmitted to the server 400.

The electric car 200*a*, 200*b*, 200*c* is provided with the power receiving module 210. The power receiving module 210 according to an embodiment of the disclosure may be installed in or detachable from the electric car 200*a*, 200*b*, 200*c*.

According to an embodiment, the power receiving module 210 may be provided suitably for an electric car charging method/terminal according to car models.

Alternatively, the power receiving module 210 may be provided compatibly with the charging terminals of all electric car models, i.e. regardless of the car models.

According to an embodiment, when a predetermined electric car 200*b* is in need of charging, a user may couple the charging cable 212 and the plug 213, which are tucked into the power receiving module 210, to the charging terminal 245 connecting with the battery 240.

The charger 100 may receive power through the power supplying connector 610 in the charging station 600, so that the battery 140 can be charged with the received power. According to an embodiment, the charging station 600 is actualized to make a plurality of chargers 100 be simultaneously charged.

Further, the charger 100 may receive a charging request for a predetermined electric car 200*b* (①). The charging request for the electric car 200*b* may be received from at least one among the user terminal apparatus 300, the server 400, the power receiving module 210, and the electric car 200*b*. For example, as shown in FIG. 21, a user may make an input of the charging request through the application installed in the terminal apparatus 300. A charging request signal generated in the terminal apparatus 300 may be directly transmitted to the charger 100, or may be transmitted to the charger 100 through the server 400 or the electric car 200*b*.

Alternatively, the controller 280 of the power receiving module 210 may transmit a signal corresponding to the charging request through the communicator 220 when it is detected that the plug 213 formed in the charging cable 212 is coupled to the charging terminal 245.

The charger 100 receives the charging request for a predetermined electric car 200*b*, and, in response to the charging request, moves, i.e. travels to a position for connection with the charging terminal 245 through the power receiving module 210 of the charging target, i.e. the electric car 200*b* in the state that the main body of the charger 100 has the outer appearance corresponding to the first shape (②).

According to an embodiment, the charger 100 autonomously moves using the traveling unit 160 controlled by the controller 180, thereby approaching the position of the charging target, i.e. the electric car 200*b*.

Here, the controller 180 may control the camera 131 to capture an image of surroundings while traveling, and the captured image is stored, i.e. recorded in the storage 170. The captured image may be transmitted to the terminal apparatus 300 and/or the server 400 through the communicator 120.

Further, the controller 180 may control the camera 131 or the sensor 132 to detect an approaching or moving object (e.g. a vehicle, a pedestrian, a bicycle, an animal, etc.) toward the traveling charger 100. When the approaching or moving object is detected in the surroundings, the controller 180 may control the traveling unit 160 to move avoiding the object or pause in accordance with the trip algorithm of the storage 170. With reference to the map, the controller 180 may control the charger 100 to pause at a position where other vehicles are unobstructed, i.e. avoiding a crossroad, a junction, etc. When it is detected by the camera 131 or the sensor 132 that a surrounding motion disappears in the state that the charger 100 is paused, the controller 180 makes the charger 100 continue to travel toward the electric car 200b.

According to an embodiment, the controller 180 may control the traveling unit 160 based on information about registered positions where the charging target, i.e. the electric car 200b has been mostly parked, so that the charger 100 can move to the registered position.

Alternatively, when the charging request is made using the terminal apparatus 300 or the like, a parking position of the charging target, i.e. the electric car 200b together with the charging request may be transmitted to the charger 100. Based on the information about the parking position received along with the charging request, the controller 180 may control the charger 100 to move to the parking position.

According to an embodiment, when the charger 100 approaches the electric car 200b, the controller 180 may detect the communicator 220 provided in the power receiving module 210 of the electric car 200 through the communicator 120, and estimate the parking position of the electric car 200b by analyzing strength of a wireless signal from the communicator 220. In addition, the controller 180 may control the traveling unit 160 based on the estimation results so that the charger 100 can get closer to the electric car 200b.

Alternatively, when the charger 100 approaches the electric car 200b, the controller 180 identifies the electric car 200b and the power receiving module 210 provided in the electric car 200b based on an image captured by the camera 131, and control the traveling unit 160 based on the identification results so that the charger 100 can get closer to the electric car 200b.

When the charger 100 reaches the position where connection with the charging target, i.e. the electric car 200b is possible, the controller 180 controls the transformer 150 to switch the outer appearance of the main body over from the first shape to the second shape ((3)). Such transformation is to minimize the surrounding area of the electric car 200b occupied by the charger 100 during charging, so that the electric car 200b can be charged for a predetermined period of time without obstructing movement of other traveling vehicles.

The controller 180 controls the traveling unit 160 so that the main body of the charger 100 can at least partially enter under the electric car 200b in the state that the charger 100 has the second shape ((4)).

During such an entering process, the first connecting portion 111 in the connector 110 of the charger 100 and the second connecting portion 211 in the power receiving module 210 of the electric car 200b are connected, i.e. docked to each other. The controller 180 controls the driving motor 112 of the connector 110 so that the first connecting portion 111 and the second connecting portion 211 can be correctly docked 112.

According to an embodiment, the first connecting portion 111 and the second connecting portion 211 may be coupled to each other by magnetism.

Further, the electric power is supplied from the battery 140 of the charger 100 to the battery 240 inside the electric car 200b via the connector 110, the power receiving module 210 and the charging terminal 245, thereby making the electric car 200b be charged.

Information related to charting states may be transmitted to the terminal apparatus 300, the server 400, etc. through the communicator 120 of the charger 100 or the communicator 220 of the power receiving module 210, so that a user can monitor the information through the application of the terminal apparatus 300. The application installed in terminal apparatus 300 may further notify a user of charging expenses or the like information based on the received information about the charging states.

According to an embodiment, when the battery 140 of the charger 100 has a remaining charge not higher than a predetermined reference level, i.e. has insufficient power during a charging operation, the controller 180 stops the charging operation and controls the traveling unit 160 to return to the charging station 600 after transformation into the first shape. In addition, the battery 140 is charged again, and then the operations of traveling to the electric car 200b, transformation and charging are performed again.

When the electric car 200b is fully charged up, the controller 180 controls the connector 110 and the power receiving module 210 to be undocked, and the charger 100 separated from the electric car 200b is switched over to the first shape for traveling.

According to an embodiment, when a charging request is received from another electric car 200c, the controller 180 detects the remaining charge of the battery 140, and controls the traveling unit 160 to move to the position of the electric car 200c in a case where the remaining charge of the battery 140 is higher than the reference level, i.e. the remaining change is enough, the controller 180 controls the traveling unit 160 to move toward the position of the electric car 200c ((5)). In addition, as described above in relation to the electric car 200b, the controller 180 controls the transformer 150 to make the outer appearance of the charger 100 switch over to the second shape, and controls the moving unit 160 and the driving motor 112 so that the connector 110 and the power receiving module 210 can be docked to each other.

When there are no charging requests received from another electric car, or the remaining charge of the battery 140 is insufficient, the controller 180 controls the traveling unit 160 so that the charger 100 can return to the charging station 600. Here, another electric car 200c that makes the charging request may be charged after charging the battery 140 of the charger 100 or may be charged by another charger.

Then, payment of charging expenses, i.e. expense payment is made. As a payment method, various processes are possible. For example, there may be various payment methods such as payment using an application of the terminal apparatus 300, payment using a credit card reader installed in the power receiving module 210, regular payment using previously registered card or account information, and so on. The regular payment may be made on a weekly/monthly/etc. basis, and may be varied depending on the amount of use, i.e. charging. According to an embodiment, a regular payment user, the best customer (or a user), etc. may qualify for rate discount.

The power receiving module 210 attached to the electric car 200b may be removed after the charging is completed. When the power receiving module 210 is provided in the electric car 200b, the charging cable 212 and the plug 213 may be disconnected from the charging terminal 245 and tucked into the power receiving module 210.

According to an embodiment, the detachable power receiving module 210 may have a locking function, and be thus removable only when payment of the charging expenses is completed.

Below, a method of controlling the charger 100 according to an embodiment of the disclosure to charge the electric vehicle 200 will be described with reference to the accompanying drawing.

Figure 22:
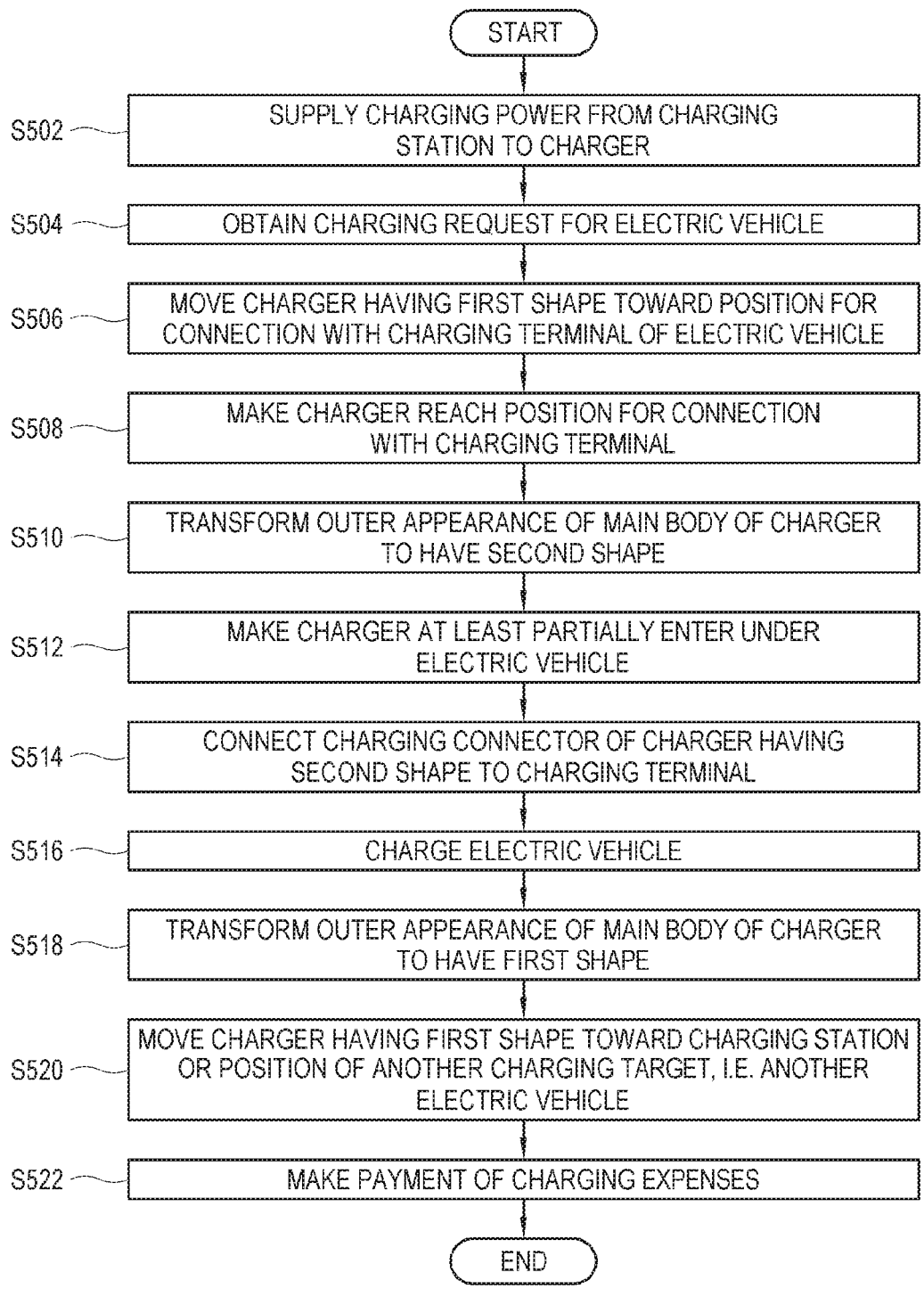
FIG. 22 is a flowchart of showing a charging control method of a charger according to an embodiment of the disclosure.

FIG. 22 is a flowchart of showing a charging control method of the charger 100 according to an embodiment of the disclosure.

As shown in FIG. 22, the charging station 600 supplies the charging power to the charger 100, thereby charging the battery 140 (S502). Here, the charger 100 may receive the charging power as the connecting portion 111 of the connector 110 is connected to the power supplying connector 610 of the charging station 600 in the state that the outer appearance of the main body has the second shape. At operation S502, when the battery 140 is fully charged up, the charger 100 may be transformed to have the first shape for traveling. The first shape makes the outer appearance of the main body have a shape in which the charger 100 can stably move on the ground having an obstacle (e.g. a speed bump and the like) by the traveling unit 160.

The charger 100, of which the battery 140 is completely charged in the operation S502, may receive the charging request for a predetermined electric car 200 (S504). Here, the charging request may be received from at least one among the user terminal apparatus 300, the server 400, the power receiving module 210, and the charging target, i.e. the electric car 200. Here, the communicator 120 may receive the charging request from an element (e.g. the navigation system installed inside the car) other than the power receiving module 210 of the electric car 200.

In response to the charging request received at operation S504, the controller 180 controls the traveling unit 160 so that the charger 100 having the first shape can move to the position at which connection with the charging terminal 245 through the power receiving module 210 of the electric car 200 is possible (S506). Here, in a case that the charger 100 has an outer appearance corresponding to the second shape at a point in time when the charging request is received, the operation S506 includes an operation of transforming the outer appearance of the charger 100 into the first shape.

As the changer 100 is moved in the operation S506, the charger 100 can reach the position for connection with the power receiving module 210 of the electric car 200 (S508).

Further, the controller 180 controls the transformer 150 so that the outer appearance of the main body of the charger 100 can be transformed into the second shape (S510).

As the charger 100 is transformed to have the second shape in the operation S510, at least a part of the charger 100, for example, the second sub main body 102 according to the first embodiment or the first and second sub main bodies 101 and 102 according to the second embodiment, enters under the electric car 200 (S512). As the main body of the charger 100 is at least partially placed under the electric car 200, the surrounding area of the electric car 200 occupied by the charger 100 is decreased in the following charging process.

Under the condition that the charger 100 having the second shape at least partially enters under the electric car 200 in the operation S512, the charging connector 110 of the charger 100 can connect with the charging terminal 245 of the electric car 200 (S514). Here, the charging connector 110 is connectable to the charging terminal 245 through the power receiving module 210 mounted to the electric car 200. Specifically, the first connecting portion 111 of the connector 110 is docked to the second connecting portion 112 of the power receiving module 210. In the operation S514, the controller 180 may control the driving motor 112 and the traveling motor 162 to finely adjust the first connecting portion 111 and the second connecting portion 211 to be corrected docked to each other.

The power is supplied from the battery 140 of the charger 100 connected in the operation S514 to the battery 240 of the electric car 200 through the power receiving module 210 and the charging terminal 245, thereby charging the electric vehicle 200 (S516).

When the charging is completed in the operation S516, the outer appearance of the main body of the charger 100 is switched over from the second shape to the first shape (S518).

The charger 100 having the first shape is movable to the charging station 600 or another charging target, i.e. another electric car (S520). Here, taking the power level of the battery 140 of the charger 100 into account, the charger 100 may return to the charging station 600 even though a charging request is received from another electric car.

Further, the payment of the charging expenses is made corresponding to the charging operation performed in the operation S516 (S522).

The features according to many embodiments of the disclosure may be partially or wholly coupled or combined, and technically variously interlocked and driven as understood by those skilled in the art, in which the embodiments may be carried out independently of each other or in association with each other.

Meanwhile, the foregoing various embodiments of the disclosure may be realized by a computer readable program and/or a recording medium stored with the program. The recording medium includes a storage medium configured to store the program. The program may be transmitted and received through a transmission medium actualized by a wired/wireless network through which computer systems are linked to one another.

The foregoing various embodiments may be realized by hardware and combination between hardware and software. As the hardware, the controller 180, 280 may include a nonvolatile memory in which a computer program is stored as the software, a volatile memory (random access memory, RAM) in which the computer program stored in the nonvolatile memory is loaded, and at least one processor configured to execute the computer program loaded in the RAM. The nonvolatile memory may include a hard disk drive, a flash memory, a ROM, CD-ROMs, magnetic tapes, a floppy disc, an optical storage, a data transmission device using the Internet, etc., but is not limited thereto. The nonvolatile memory is a kind of computer-readable recording medium in which the program readable by a computer of the disclosure is recorded.

The computer program refers to a code that is read and executed by the CPU, and includes codes for performing the operations of the controller 180 such as the operations S502 to S522 as shown in FIG. 22.

The computer program may be actualized as included in an operating system provided in the charging apparatus 100, or software including a program/application, and/or software interfacing with an external apparatus.

Although the disclosure has been shown and described through exemplary embodiments, the disclosure is not limited to the exemplary embodiments and may be variously materialized within the appended claims.

The invention claimed is:

1. A charger for an electric vehicle, comprising:
   a main body comprising a charging connector to be connected to a charging terminal provided in the electric vehicle;

a moving unit provided in the main body and configured to make the main body be movable;

a transformer configured to switch an outer appearance of the main body over between a first shape allowing the main body to be movable on a ground through the moving unit and a second shape making the main body occupy a smaller surrounding area of the electric vehicle than the first shape during a charging operation for the electric vehicle; and a controller configured to, based on the main body being positioned to be connectable with the charging terminal through the connector, control the transformer to switch the outer appearance of the charger over from the first shape to the second shape, wherein the main body comprises a first sub body and a second sub body, each of which is shaped like a plate, coupled to be switchable between the first shape and the second shape based on change in a relative position thereof, and wherein one end portion of the second sub body is coupled to a first position on a plate surface of the first sub body in the first shape, and the one end portion of the second sub body is coupled to a second position on the plate surface of the first sub body in the second shape so that the charging terminal of the electric vehicle is connected to the charging connector of the charger in a stationary state.

2. The charger according to claim 1, wherein the first shape comprises a shape in which the second sub body and the second sub body are coupled to each other to form a T-shape, and wherein the second shape comprises a shape in which the first sub body and the second sub body are coupled to each other to form an L-shape.

3. The charger according to claim 1, wherein the first sub body and the second sub body are coupled to each other rotatable on each first end portion thereof used as a rotation axial line, wherein the first shape comprises a shape in which the first sub body and the second sub body are relatively rotated on the rotation axial line to come close to each other with second end portions thereof being supported on the ground, and wherein the second shape comprises a shape in which the first sub body and the second sub body are relatively rotated on the rotation axial line to be disposed on one plane.

4. The charger according to any one of claim 1, wherein the controller controls the moving unit to move the main body to a position for charging the electric vehicle, based on a charging request for the electric vehicle.

5. The charger according to any one of claim 1, further comprising:

a camera or sensor configured to detect surroundings of the main body; and a storage configured to store a trip algorithm for the charger or a map of an installation space for the charger, wherein the controller controls a movement of the charger by applying detection data obtained from the camera or the sensor to the algorithm or the map.

6. The charger according to any one of claim 1, wherein the electric vehicle is provided with a power receiving module comprising the charging terminal and a charging cable, to connect with the charging connector of the charger, and wherein the charging connector is connected to the charging terminal and makes charging power be supplied to the electric vehicle through the power receiving module.

7. A method of controlling a charger for an electric vehicle, the method comprising:

moving the charger to a position to be connectable with a charging terminal provided in the electric vehicle, based on an outer appearance of a main body of the charger having a first shape allowing the main body to be movable on a ground by a moving unit provided in the charger;

based on the charger reaching the connectable position, transforming the outer appearance of the main body to have a second shape making the main body occupy a smaller surrounding area of the electric vehicle than the first shape; and charging the electric vehicle through a charging connector of the charger connected to the charging terminal of the electric vehicle based on the second shape, wherein the main body comprises a first sub body and a second sub body, each of which is shaped like a plate, coupled to be switchable between the first shape and the second shape based on change in a relative position thereof, and wherein one end portion of the second sub body is coupled to a first position on a plate surface of the first sub body in the first shape, and the one end portion of the second sub body is coupled to a second position on the plate surface of the first sub body in the second shape so that the charging terminal of the electric vehicle is connected to the charging connector of the charger in a stationary state.

8. The method according to claim 7, further comprising moving the charger as transformed into the second shape to make the main body at least partially enter under the electric vehicle.

9. The method according to claim 7, further comprising:

transforming the main body to have the first shape based on completion of the charging; and moving the charger having the first shape to a charging station or a position of another charging target, i.e. another electric vehicle.

10. The method according to claim 7, further comprising:

by the charger, obtaining information about a battery remaining or charging state of the electric vehicle targeted for the charging; and making payment of charging expenses based on the information obtained as the charging is completed.

11. The method according to claim 7, further comprising:

by the charger, making a battery of the charger be supplied with charging power, with which the electric vehicle will be charged, from a charging station, wherein the supply of the charging power is performed in a time slot during which power consumption is low.

12. The method according to any one of claim 7, further comprising:

by the charger, obtaining a charging request from at least one of a user terminal apparatus, a server or the electric vehicle.

13. The method according to any one of claim 7, further comprising:

obtaining detection data about surroundings of the charger from a camera or a sensor, wherein a movement of the charger is controlled by applying the obtained detection data to a trip algorithm for the charger or a map of an installation space for the charger.

* * * * *